United States Patent
Mochizuki et al.

(10) Patent No.: US 7,991,078 B2
(45) Date of Patent: Aug. 2, 2011

(54) SIGNAL PROCESSING APPARATUS, SIGNAL PROCESSING METHOD, AND PROGRAM

(75) Inventors: Shunsuke Mochizuki, Tokyo (JP);
Takashi Nakanishi, Tokyo (JP);
Ryosuke Araki, Tokyo (JP); Seiji Wada, Kanagawa (JP); Masahiro Yoshioka, Tokyo (JP); Hiroto Kimura, Tokyo (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 11/953,397

(22) Filed: Dec. 10, 2007

(65) Prior Publication Data
US 2008/0212723 A1 Sep. 4, 2008

(30) Foreign Application Priority Data
Dec. 26, 2006 (JP) ................................. 2006-350357

(51) Int. Cl.
*H03K 9/00* (2006.01)
*H04L 27/00* (2006.01)
(52) U.S. Cl. ......... 375/316; 375/229; 333/18; 333/28 R; 381/103; 708/323
(58) Field of Classification Search .................. None
See application file for complete search history.

(56) References Cited

U.S. PATENT DOCUMENTS

| 7,433,401 | B1 * | 10/2008 | Roo | 375/233 |
| 2004/0042545 | A1 * | 3/2004 | Han et al. | 375/232 |
| 2004/0042546 | A1 * | 3/2004 | Han et al. | 375/233 |
| 2004/0073321 | A1 | 4/2004 | Kondo | |
| 2005/0152488 | A1 * | 7/2005 | Buckwalter et al. | 375/350 |

FOREIGN PATENT DOCUMENTS
JP 2003-179821 6/2003
* cited by examiner

*Primary Examiner* — Shuwang Liu
*Assistant Examiner* — Gina McKie
(74) *Attorney, Agent, or Firm* — Oblon, Spivak, McClelland, Maier & Neustadt, L.L.P.

(57) ABSTRACT

In a signal processing apparatus adapted to process a signal transmitted via a transmission path, distortion of a waveform of a signal value of a specific symbol is predicted on the basis of a characteristic of distortion depending on values of symbols transmitted before the specific symbol, and the distortion is removed from the waveform of the received signal thereby producing a distortion-removed waveform. A comparison value is calculated for each allowable value of the specific symbol by subtracting a predicted signal value of the specific value from the distortion-removed waveform. A symbol value corresponding to the smallest comparison value is determined as the value of the specific symbol. An error suspicion level value indicating the degree of suspicion of being incorrect is calculated for each of the predetermined number of symbols, and already determined values of symbols are corrected in accordance with the error suspicion level values.

10 Claims, 21 Drawing Sheets

FIG. 19

WEIGHT
CURRENT BIT: 1.0
1 BIT BEFORE: 0.5
2 BITS BEFORE: 0.4
3 BITS BEFORE: 0.2
4 BITS BEFORE: 0.3
5 BITS BEFORE: 0.1

$a_k$: WEIGHT      $e_{km}$: VALUE DESCRIBED IN ERROR SUSPICION TABLE

FORMULA OF WEIGHT: $a_0 \times e_{k0} + a_1 \times e_{k1} + a_2 \times e_{k2} + a_3 \times e_{k3} + a_4 \times e_{k4} + a_5 \times e_{k5}$

| x8 | x7 | x6 | x5 | x4 | x3 | x2 | x1 | x0 |
|----|----|----|----|----|----|----|----|----|

⋮   ⋮   ⋮   ⋮   ⋮

$1 \times 1.0 - 1 \times 0.5 + 1 \times 0.4 - 1 \times 0.2 + 1 \times 0.3 - 1 \times 0.1 = 0.9$ → $0.9 > 0$ → ok $1 \times 1.0 + 1 \times 0.5 - 1 \times 0.4 + 1 \times 0.2 + 1 \times 0.3 + 1 \times 0.1 = 1.7$ → $1.7 > 0$ → ok $1 \times 1.0 + 1 \times 0.5 + 1 \times 0.4 + 1 \times 0.2 + 1 \times 0.3 + 1 \times 0.1 = 2.5$ → $2.5 > 0$ → ok $1 \times 1.0 - 1 \times 0.5 - 1 \times 0.4 - 1 \times 0.2 - 1 \times 0.3 - 1 \times 0.1 = -0.5$ → $-0.5 < 0$ → error

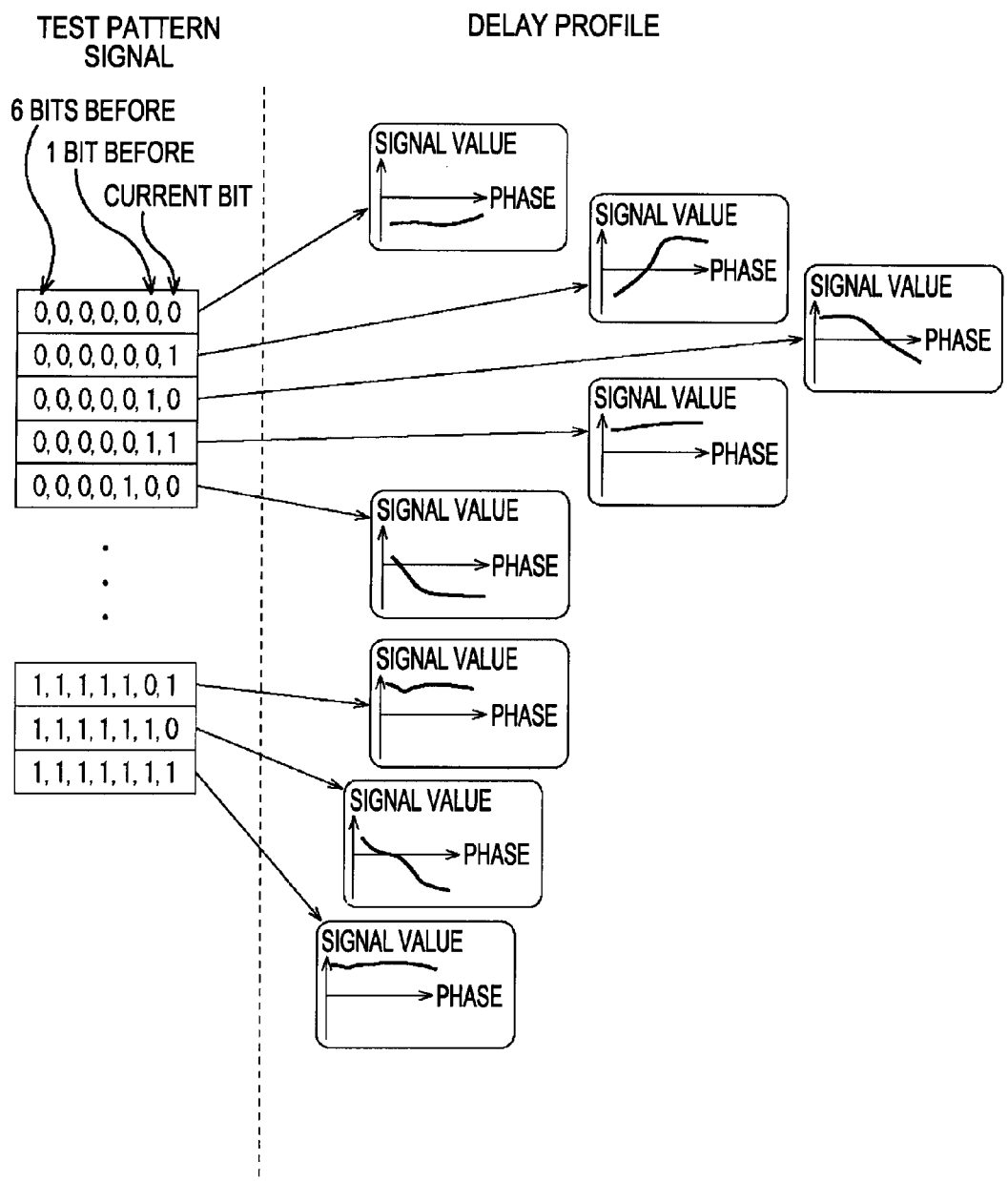

SIGNAL PROCESSING APPARATUS, SIGNAL PROCESSING METHOD, AND PROGRAM

CROSS REFERENCES TO RELATED APPLICATIONS

The present invention contains subject matter related to Japanese Patent Application JP 2006-350357 filed in the Japanese Patent Office on Dec. 26, 2006, the entire contents of which are incorporated herein by reference.

BACKGROUND OF THE INVENTION

1. Field of the Invention

The present invention relates to a signal processing apparatus, a signal processing method, and a program. More specifically, the present invention relates to a signal processing apparatus, a signal processing method, and a program, capable of improving transmission quality of a signal transmitted via a transmission path which produces distortion of the signal.

2. Description of the Related Art

In a related art, a signal processing apparatus receives an image signal from an external device such as a tuner adapted to receive a television broadcast signal or a DVD (Digital Versatile Disc) player, processes the received image signal, and supplies the resultant image signal to a display such as a CRT (Cathode Ray Tube) or a LCD (Liquid Crystal Display).

The signal processing performed by such a signal processing apparatus includes, for example, a process of removing noise from the image signal supplied from an external device, a process of converting an image signal supplied from an external device into a form having higher quality than the original quality, and a process of adjusting brightness or contrast of an image displayed on a display.

FIG. 1 is a block diagram illustrating an example of a configuration o a signal processing apparatus.

As shown in FIG. 1, the signal processing apparatus 11 includes a case 12, connectors $13_1$ to $13_4$, an input selector 14, a signal router 15, connectors $16_1$ to $16_4$, connectors $17_1$ to $17_3$, functional blocks $18_1$ to $18_3$, a connector 19, a remote commander 20, an operation unit 21, a system control block 22, and a control bus 23.

In the signal processing apparatus 11, the connectors $13_1$ to $13_4$ are connected to the input selector 14 via signal cables, and the input selector 14 is connected to the signal router 15 via a signal cable. The signal router 15 is connected to the connectors $16_1$ to $16_4$ and the connector 19 via signal cables. The signal router 15 is connected to the functional blocks $18_1$ to $18_3$ via the connectors $16_1$ to $16_3$ and the connectors $17_1$ to $17_3$. The input selector 14, the signal router 15, the connectors $16_1$ to $16_4$, and the system control block 22 are connected to each other via the control bus 23.

The case 12 is formed in the shape of, for example, a rectangular box. On the outer surface of the case 12, the connectors $13_1$ to $13_4$, the connector 19, and the operation unit 21 are disposed. In the inside of the case 12, the input selector 14, the signal router 15, the connectors $16_1$ to $16_4$, the connectors $17_1$ to $17_3$, the functional blocks $18_1$ to $18_3$, the system control block 22, and the control bus 23 are disposed.

The connectors $13_1$ to $13_4$ are for a connection, via a cable, between the signal processing apparatus 11 and an external apparatus (not shown) such as a tuner or a DVD player from which an image signal is supplied to the signal processing apparatus 11.

Image signals are supplied from external apparatuses to the input selector 14 via the connectors $13_1$ to $13_4$. Under the control of the system control block 22, the input selector 14 selects one of image signals supplied from the external apparatuses via the connectors $13_1$ to $13_4$, and the input selector 14 supplies the selected image signal to the signal router 15.

Under the control of the system control block 22, the signal router 15 supplies the signal received via the input selector 14 to the functional blocks $18_1$ to $18_3$ the connectors $16_1$ to $16_3$ and the connectors $17_1$ to $17_3$. The functional blocks $18_1$ to $18_3$ perform signal processing on the signals and return the resultant signals to the signal router 15. The signal router 15 transfers the received signals to a display (not shown) connected to the connector 19.

The connectors $17_1$ to $17_3$ are connectable/disconnectable to/from the connectors $16_1$ to $16_3$ so that the functional blocks $18_1$ to $18_3$ are connected to the signal router 15 or the control bus 23. The connector $16_4$ is for future use of a connection with a new functional block or the like which will be added to the signal processing apparatus 11.

The functional blocks $18_1$ to $18_3$ include a signal processing circuit for noise reduction, image conversion, or image correction. The functional blocks $18_1$ to $18_3$ perform signal processing on the signal supplied from the signal router 15 and return the resultant signal to the signal router 15.

The connector 19 is for connecting, via a cable, the signal processing apparatus 11 to the display for displaying an image in accordance with the image signal output from the signal processing apparatus 11.

The remote commander 20 includes a plurality of buttons or the like. If a button is operated by a user, an operation signal depending on the operated button is transmitted in the form of an infrared ray or the like to the system control block 22.

The operation unit 21 includes a plurality of buttons or the like, as with the remote commander 20. If a button is operated by a user, an operation signal depending on the operated button is supplied to the system control block 22.

If the system control block 22 receives the operation signal generated depending on the operation of the user from the remote commander 20 or the operation unit 21, the system control block 22 controls the input selector 14, the signal router 15, and the functional blocks $18_1$ to $18_3$ via the control bus 23 so that a process is performed in accordance with the operation signal.

In the signal processing apparatus 11, as described above, an image signal is supplied to the signal router 15 via the connectors $13_1$ to $13_4$ and the input selector 14, and an image signal is transmitted between the signal router 15 and functional blocks $18_1$ to $18_3$ via signal cables.

A recent trend is toward an increase in resolution of images. Accordingly, the data size of the image signal processed by the signal processing apparatus 11 tends to increase. To handle image signals with great data sizes, it is necessary to transmit image signals at a high rate between the signal router 15 and the functional blocks $18_1$ to $18_3$ via cables. However, the increase in the signal transmission rate can cause problems associated with frequency characteristics of signal cables, crosstalk, a difference in signal propagation timing (skew) between parallel signal cables, etc.

Japanese Unexamined Patent Application Publication No. 2003-179821 discloses a signal processing apparatus adapted to transmit signals by wireless communication using an electromagnetic wave among circuit boards disposed in a case thereby performing signal processing.

Use of wireless transmission using electromagnetic waves between the signal router 15 and the functional blocks $18_1$ to $18_3$ makes it possible to avoid the problems which can occur when signals are transmitted at high rates via signal cables.

However, if signals are transmitted by wireless communication using electromagnetic waves between signal router 15 and the functional blocks $18_1$ to $18_3$ in the inside of the case 12 of the signal processing apparatus 11, a plurality of transmission paths (multipath) which are different in length can occur due to reflection of electromagnetic waves from walls of the case 12 or due to diffraction of electromagnetic waves by circuit boards disposed in the case 12. The signal transmission via multiple paths can shift the phase of the signal arriving at the receiving part, and thus interference between signals can occur.

In wireless communication in a case such as the case 12 or in wireless communication in which a signal waveform is distorted by signal interference which occurs when a signal is transmitted via a transmission path, the distortion of the signal waveform makes it difficult for a circuit board at a receiving end to correctly detect the signal, which results in degradation in communication quality.

The problem associated with the multipath interference can occur not only in wireless communication within a case, but also in mobile communication between portable telephone devices due to a shift in signal phase caused by multipath produced by reflection of electromagnetic waves from buildings. Thus degradation in communication quality occurs. Interference can also occur between an original signal propagating along a cable and a signal reflected by an end of the cable, and degradation in communication quality can occur.

One possible method for handling multipath problems in wireless communication is to use OFDM (Orthogonal Frequency Division Multiplexing) as a modulation method. Another method is to use a spread spectrum communication technique and a rake reception technique. It is also known to use a multi-antenna and/or a waveform equalizer to handle multipath problems.

In the signal processing on signals transmitted at a high rate as with signal processing on the image signal (in particular on non-compressed image signals), it is required that a delay occurring during the signal processing should be short enough and the delay should be controlled at a constant value. However, in any technique described above, it is difficult to achieve a short and steady delay time in the signal processing.

When OFDM is employed as the modulation method, a large processing load is imposed on a device responsible for a FFT (Fast Fourier Transform) process in modulation and demodulation, and the large processing load can cause the device to generate a large amount of heat. Besides such a device is expensive. In the case where the spread spectrum method is used, to achieve high-speed communication, it is necessary to perform the signal processing at a sufficiently high speed compared with the signal transmission speed. However, it is difficult to perform the signal processing at such a high speed, and thus it is difficult to achieve high-speed communication using the spread spectrum method.

In the case where the multi-antenna or the waveform equalizer is used, it is necessary to insert a UW (Unique Word) in a packet, and a complicated prediction circuit is necessary to achieve high accuracy in prediction of a change in a transmission characteristic.

SUMMARY OF THE INVENTION

As described above, in wireless communication in a case of a signal processing apparatus, distortion of a signal waveform due to signal interference occurs, which results in degradation in communication quality.

In view of the above, it is desirable to provide a technique to improve communication quality in communication performed via a transmission path which can cause a signal to be distorted.

According to an embodiment of the present invention, there is provided a signal processing apparatus adapted to process a signal transmitted via a transmission path causing a waveform represented by a signal value of a specific symbol to have stationary distortion depending on a value of a symbol transmitted before the specific symbol, comprising acquisition means for acquiring the signal value of the specific symbol from a signal transmitted via the transmission path, distortion removing means for removing, from the waveform represented by the signal value of the specific symbol acquired by the acquisition means, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform, comparison value calculation means for calculating a comparison value for each of values allowed to be taken by the specific symbol, by subtracting, from the signal value of the distortion-removed waveform calculated by the distortion removing means, a signal value predicted as that of the specific symbol in accordance with a characteristic of the waveform represented by the signal value of the specific symbol depending on the value of the symbol, for each of the values allowed to be taken by the specific symbol, determination means for determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values, suspected error detecting means for generating an error suspicion level value indicating the degree of suspicion of being incorrect for the value of each of the predetermined number of symbols, on the basis of values already determined by the determination means for a predetermined number of symbols transmitted before the specific symbol, the characteristic of the distortion, and the smallest comparison value, and error correction means for correcting the values already determined by the determination means for the symbols, in accordance with the error suspicion level values generated by the suspected error detecting means.

According to an embodiment of the present invention, there is provided a method of processing a signal transmitted via a transmission path causing a waveform represented by a signal value of a specific symbol to have stationary distortion depending on a value of a symbol transmitted before the specific symbol, comprising the steps of acquiring the signal value of the specific symbol from a signal transmitted via the transmission path, removing, from the waveform represented by the signal value of the specific symbol, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform, calculating a comparison value for each of values allowed to be taken by the specific symbol, by subtracting, from the signal value of the distortion-removed waveform, a signal value predicted as that of the specific symbol in accordance with a characteristic of the waveform represented by the signal value of the specific symbol depending on the value of the symbol, for each of the values allowed to be taken by the specific symbol, determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values, generating an error suspicion level value indicating the degree of suspicion of being incorrect for the value of each of the predetermined number of symbols, on the basis of values already determined for a predetermined number of symbols transmitted before the specific symbol, the characteristic of the distortion, and the smallest comparison value, and correcting the values already determined for the symbols, in accordance with the error suspicion level values.

According to an embodiment of the present invention, there is provided a program executable by a computer to perform a process on a signal transmitted via a transmission path causing a waveform represented by a signal value of a specific symbol to have stationary distortion depending on a value of a symbol transmitted before the specific symbol, the process including the steps of acquiring the signal value of the specific symbol from a signal transmitted via the transmission path, removing, from the waveform represented by the signal value of the specific symbol, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform, calculating a comparison value for each of values allowed to be taken by the specific symbol, by subtracting, from the signal value of the distortion-removed waveform, a signal value predicted as that of the specific symbol in accordance with a characteristic of the waveform represented by the signal value of the specific symbol depending on the value of the symbol, for each of the values allowed to be taken by the specific symbol, determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values, generating an error suspicion level value indicating the degree of suspicion of being incorrect for the value of each of the predetermined number of symbols, on the basis of values already determined for a predetermined number of symbols transmitted before the specific symbol, the characteristic of the distortion, and the smallest comparison value, and correcting the values already determined for the symbols, in accordance with the error suspicion level values.

In the signal processing apparatus, the method, and the program, as described above, the signal value of the specific symbol is acquired from a signal transmitted via the transmission path, and the distortion-removed waveform is calculated by removing, from the waveform represented by the signal value of the specific symbol, distortion predicted to occur in the waveform represented by the signal value of the specific symbol in accordance with a characteristic of distortion occurring in the waveform represented by the signal value of the specific symbol, depending on the value of the symbol transmitted before the specific symbol. The comparison value for each of values allowed to be taken by the specific symbol is calculated by subtracting, from the signal value of the distortion-removed waveform, a signal value predicted as that of the specific symbol in accordance with a characteristic of the waveform represented by the signal value of the specific symbol depending on the value of the symbol, for each of the values allowed to be taken by the specific symbol. The value of the specific symbol of the signal transmitted via the transmission path is determined by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values. The error suspicion level value indicating the degree of suspicion of being incorrect for the value of each of the predetermined number of symbols is generated on the basis of values already determined for a predetermined number of symbols transmitted before the specific symbol, the characteristic of the distortion, and the smallest comparison value, and the values already determined for the symbols are corrected in accordance with the error suspicion level values.

As described above, the present invention provides the advantage that high communication quality can be achieved in transmission performed via a transmission path which can cause a signal to be distorted.

BRIEF DESCRIPTION OF THE DRAWINGS

FIG. 19 is a diagram illustrating a method of determining an error suspicion level value;

FIG. 20 illustrates examples of a test pattern signal and a delay profile; and

DESCRIPTION OF THE PREFERRED EMBODIMENTS

Figure 1:
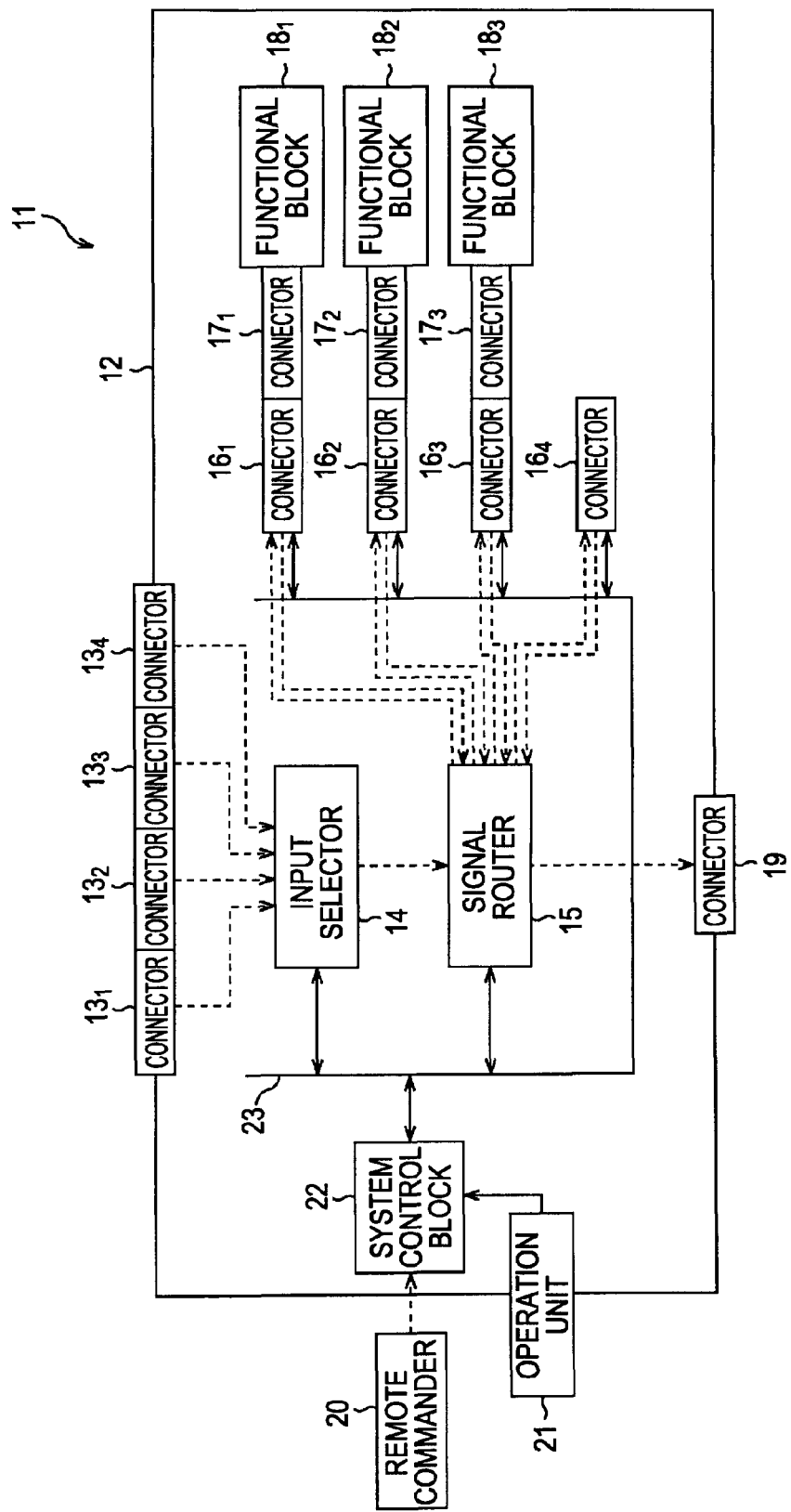
FIG. 1 is a block diagram illustrating an example of a configuration of a signal processing apparatus.

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

According to an embodiment of the present invention, there is provided a signal processing apparatus adapted to process a signal transmitted via a transmission path causing a waveform represented by a signal value of a specific symbol to have stationary distortion depending on a value of a symbol transmitted before the specific symbol, comprising acquisition means (for example, an analog-to-digital converter 82 shown in FIG. 8) for acquiring the signal value of the specific symbol from a signal transmitted via the transmission path, distortion removing means (for example, a distortion removing unit 84 shown in FIG. 8) for removing, from the waveform represented by the signal value of the specific symbol acquired by the acquisition means, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform, comparison value calculation means (for example, comparison value generators 85 and 86) for calculating a comparison value for each of values allowed to be taken by the specific symbol, by subtracting, from the signal value of the distortion-removed waveform calculated by the distortion removing means, a signal value predicted as that of the specific symbol in accordance with a characteristic of the waveform represented by the signal value of the specific symbol depending on the value of the symbol, for each of the values allowed to be taken by the specific symbol, determination means (for example, a comparator 87 shown in FIG. 8) for determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values, suspected error detecting means (for example, a suspected error detector 88 shown in FIG. 8) for generating an error suspicion level value indicating the degree of suspicion of being incorrect for the value of each of the predetermined number of symbols, on the basis of values already determined by the determination means for a predetermined number of symbols transmitted before the specific symbol, the characteristic of the distortion, and the smallest comparison value, and error correction means (for example, an error correction unit 89 shown in FIG. 8) for correcting the values already determined by the determination means for the symbols, in accordance with the error suspicion level values generated by the suspected error detecting means.

Figure 12:
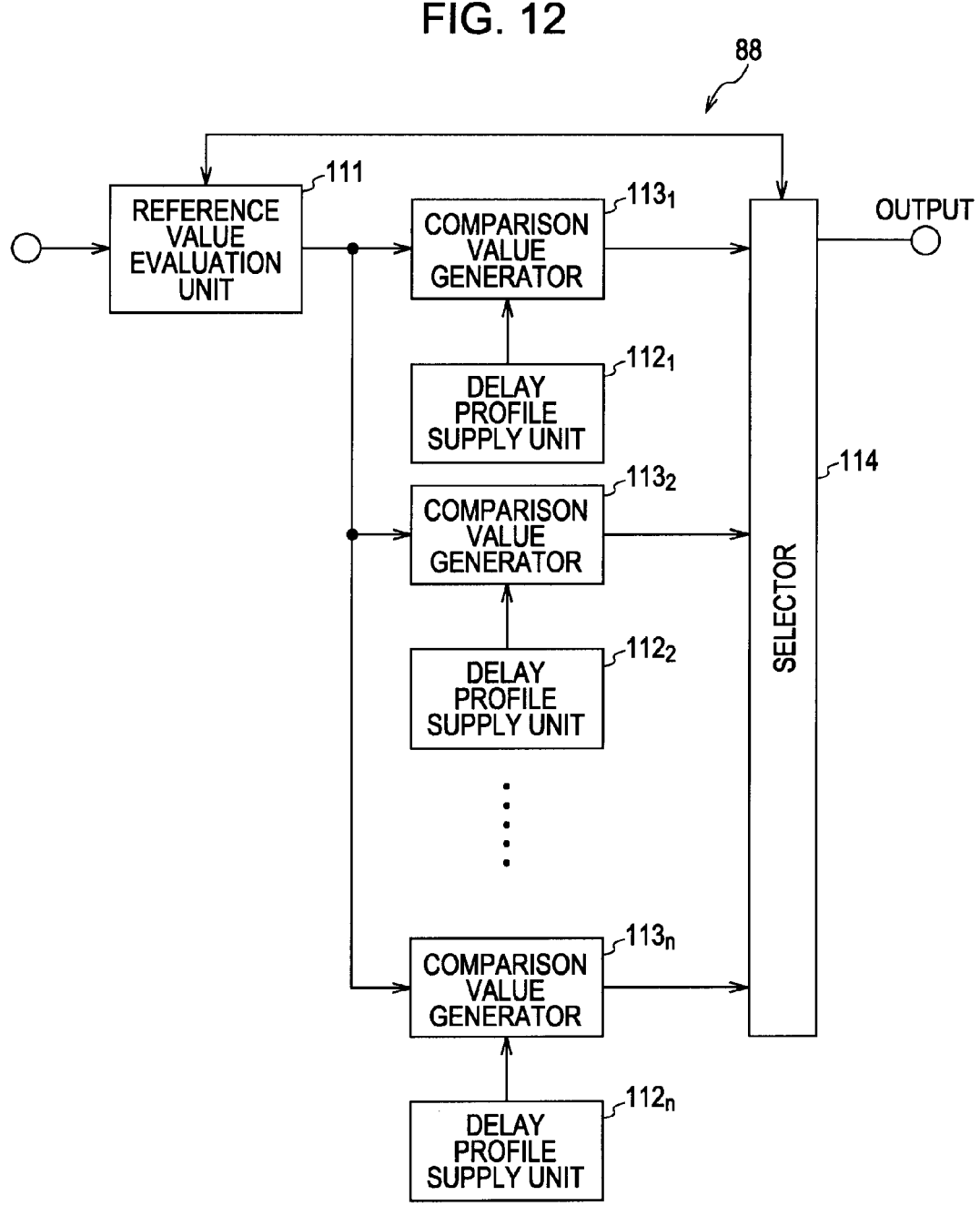
FIG. 12 is a block diagram illustrating an example of a configuration of a suspected error detector.

In this signal processing apparatus, the suspected error detecting means may include comparison value recalculation means (for example, comparison value generators $113_1$ to $113_n$ shown in FIG. 12) for recalculating the comparison values by using a set of values of the predetermined number of symbols obtained by changing, into another allowable value, the value of a bit in the set of values already determined by the determination means for the predetermined number of symbols, and by using also the characteristic of the distortion and the smallest comparison value, and selection means (for example, a selector 114 shown in FIG. 12) for detecting a symbol corresponding to the changed value in the set of values of symbols for which the comparison value calculated by the comparison value recalculation means is the smallest, and selecting the detected symbol as a suspicious symbol suspected of being incorrect, wherein each time the determination means determines the value of the specific symbol, the comparison value recalculation means performs the comparison value calculation, and the selection means performs the suspicious symbol selection, whereby the number of times the specific symbol has been selected as a suspicious symbol by the selection means is employed as the error suspicion level value for the specific symbol.

The signal processing apparatus may further include receiving means (for example, a wireless receiver 73 shown in FIG. 5) for receiving a test signal including a plurality of symbols taking predetermined values, and characteristic acquisition means (for example, a statistical processing unit 74 shown in FIG. 5) for determining the characteristic of the distortion on the basis of the signal value of the specific symbol of the test signal received by the receiving means and values of the plurality of symbols of the test signal.

Figure 16:
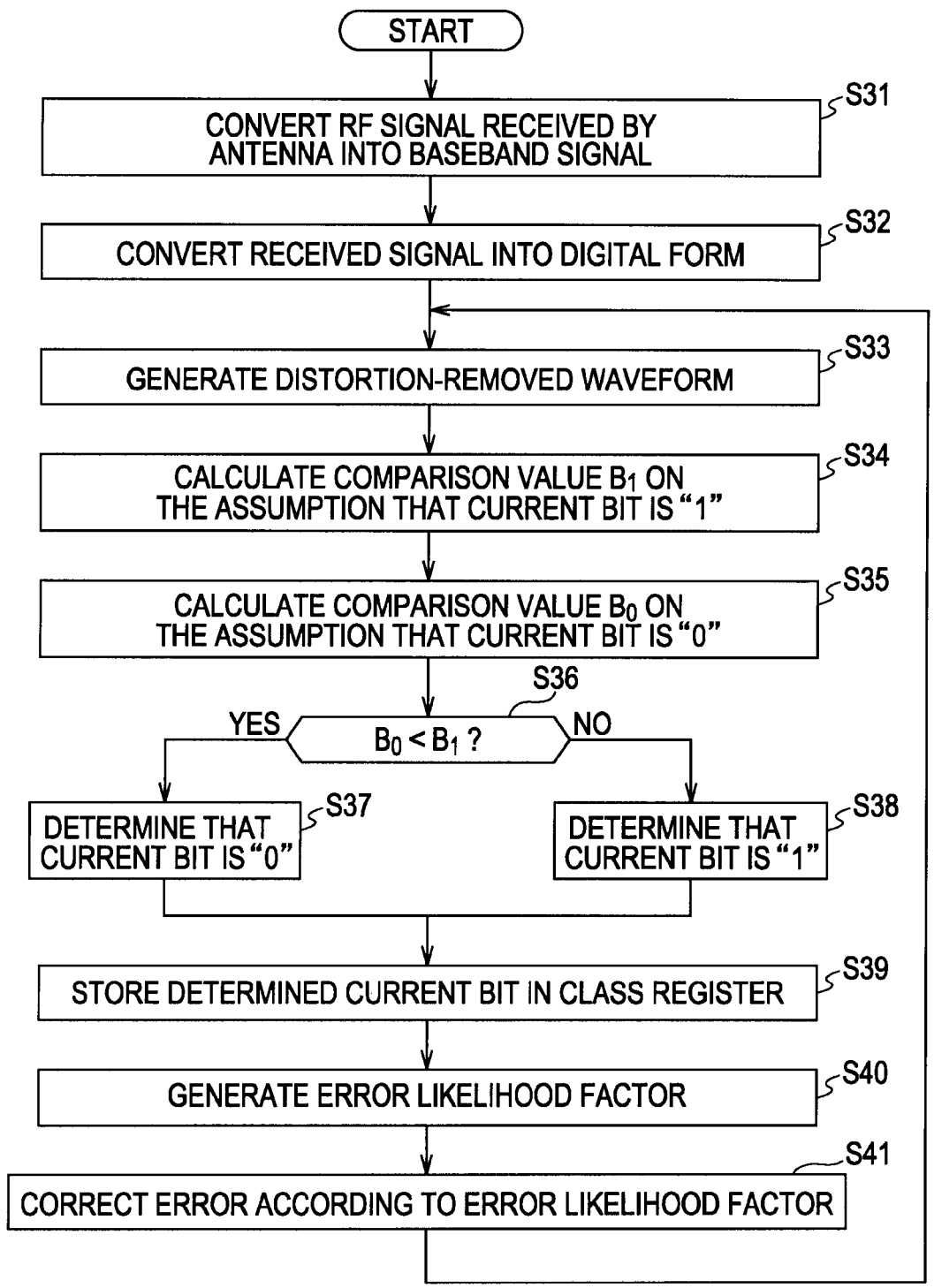
FIG. 16 is a flow chart illustrating a process performed by a functional block to determine values of bits of a received signal and correct an error if an error is detected in the already-determined values.

According to an embodiment of the present invention, there is provided a method of processing a signal transmitted via a transmission path causing a waveform represented by a signal value of a specific symbol to have stationary distortion depending on a value of a symbol transmitted before the specific symbol, including the steps of acquiring the signal value of the specific symbol from a signal transmitted via the transmission path (for example, in step S32 in FIG. 16), removing, from the waveform represented by the signal value of the specific symbol, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform (for example, in step S33 in FIG. 16), calculating a comparison value for each of values allowed to be taken by the specific symbol, by subtracting, from the signal value of the distortion-removed waveform, a signal value predicted as that of the specific symbol in accordance with a characteristic of the waveform represented by the signal value of the specific symbol depending on the value of the symbol, for each of the values allowed to be taken by the specific symbol (for example, in steps S34 and S35 in FIG. 16), determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values (for example, in step S36 in FIG. 16), generating an error suspicion level value indicating the degree of suspicion of being incorrect for the value of each of the predetermined number of symbols, on the basis of values already determined for a predetermined number of symbols transmitted before the specific symbol, the characteristic of the distortion, and the smallest comparison value (for example, in step S40 in FIG. 16), and correcting the values already determined for the symbols, in accordance with the error suspicion level values (for example, in step S41 in FIG. 16). According to an embodiment of the present invention, there is provided a program executable by a computer to perform a process on a signal transmitted via a transmission path causing a waveform represented by a signal value of a specific symbol to have stationary distortion depending on a value of a symbol transmitted before the specific symbol, the process including the steps of acquiring the signal value of the specific symbol from a signal transmitted via the transmission path (for example, in step S32 in FIG. 16), removing, from the waveform represented by the signal value of the specific symbol, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform (for example, in step S33 in FIG. 16), calculating a comparison value for each of values allowed to be taken by the specific symbol, by subtracting, from the signal value of the distortion-removed waveform, a signal value predicted as that of the specific symbol in accordance with a characteristic of the waveform represented by the signal value of the specific symbol depending on the value of the symbol, for each of the values allowed to be taken by the specific symbol (for example, in steps S34 and S35 in FIG. 16), determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values (for example, in step S36 in FIG. 16), generating an error suspicion level value indicating the degree of suspicion of being incorrect for the value of each of the predetermined number of symbols, on the basis of values already determined for a predetermined number of symbols transmitted before the specific symbol, the characteristic of the distortion, and the smallest comparison value (for example, in step S40 in FIG. 16), and correcting the values already determined for the symbols, in accordance with the error suspicion level values (for example, in step S41 in FIG. 16).

The present invention is described in further detail below with reference to embodiments in conjunction with the accompanying drawings.

Figure 2:
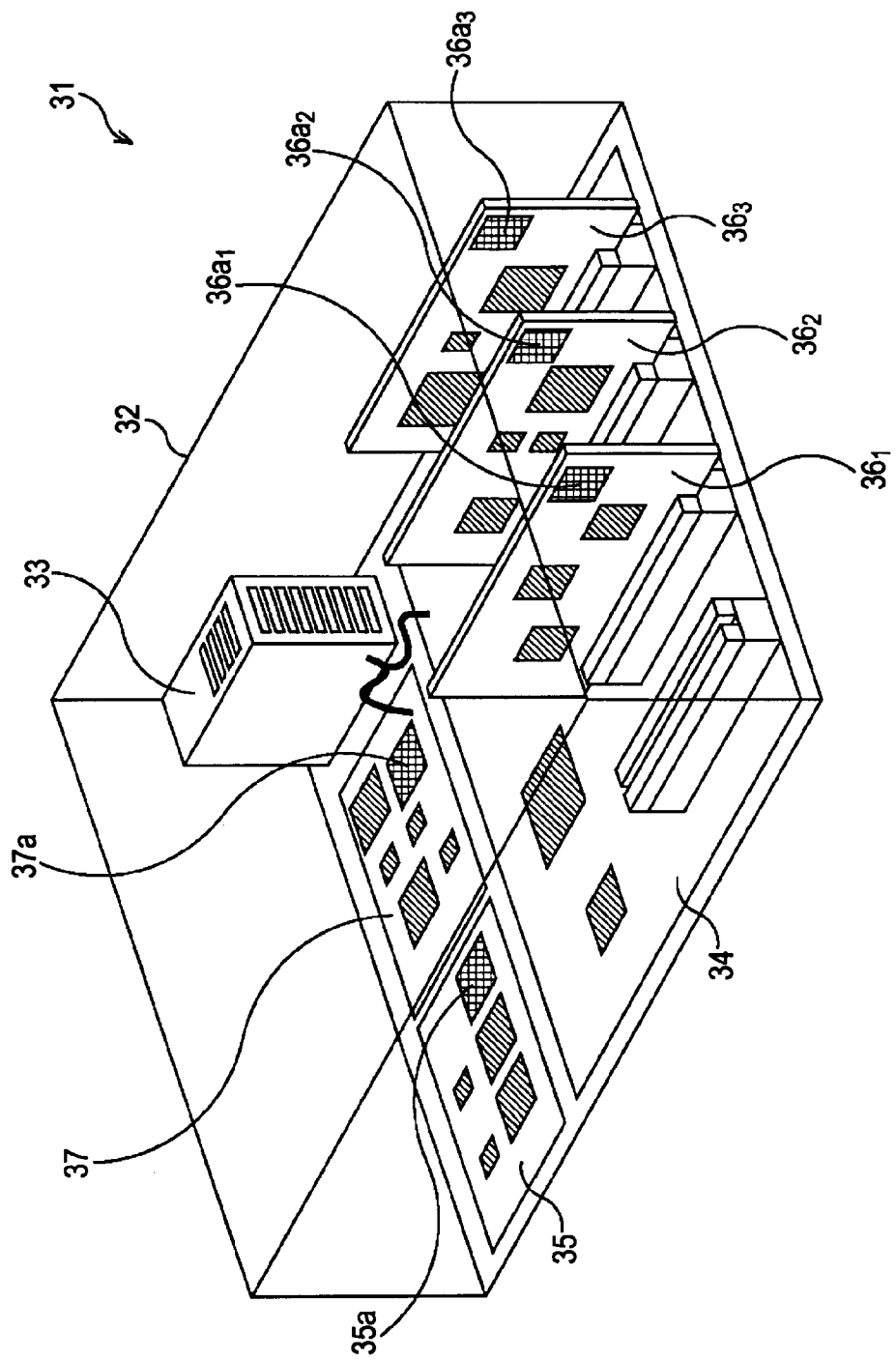
FIG. 2 is a perspective view of a signal processing apparatus according to an embodiment of the present invention.

FIG. 2 is a perspective view of a signal processing apparatus according to an embodiment of the present invention.

As shown in FIG. 2, the signal processing apparatus 31 includes a case 32, a power supply module 33, a platform board 34, an input board 35, signal processing boards $36_1$ to $36_3$, and an output board 37.

The case 32 is formed in the shape of a rectangular box. In the inside of the case 32, the power supply module 33, the platform board 34, the input board 35, the signal processing boards $36_1$ to $36_3$, and the output board 37 are disposed.

The power supply module 33 is adapted to supply power to the platform board 34, the input board 35, the signal processing boards $36_1$ to $36_3$, and the output board 37.

The signal processing boards $36_1$ to $36_3$ are mounted on the platform board 34, and power is supplied from the power supply module 33 to the signal processing boards $36_1$ to $36_3$ via the platform board 34.

The input board 35 is connected to a connector (such as connectors $43_1$ to $43_4$ described later with reference to FIG. 3) disposed on the outer side of the case 32. An image signal is supplied from an external apparatus (not shown) to the input board 35 via the connector. The input board 35 has an antenna 35a for wireless communication using an electromagnetic wave whereby the image signal supplied from the external apparatus is supplied to the signal processing boards $36_1$ to $36_3$ via the antenna 35a.

The signal processing boards $36_1$ to $36_3$ respectively have antennas $36a_1$ to $36a_3$ for wireless communication using an electromagnetic wave. The image signal output from the input board 35 is supplied to the signal processing boards $36_1$ to $36_3$ via the antennas $36a_1$ to $36a_3$. The signal processing boards $36_1$ to $36_3$ perform signal processing such as noise reduction, image conversion, or image correction on the image signal supplied from the input board 35, and return the resultant image signal to the output board 37 via the antennas $36a_1$ to $36a_3$.

The output board 37 has an antenna 37a for wireless communication using an electromagnetic wave, and the output board 37 is connected to a connector (for example, a connector 47 shown in FIG. 3) disposed on the outer side of the case 32. If the output board 37 receives an image signal from one of the signal processing boards $36_1$ to $36_3$ via the antenna 37a, the output board 37 supplies the received image signal to a display (not shown) connected to a connector disposed on the case 32.

Figure 3:
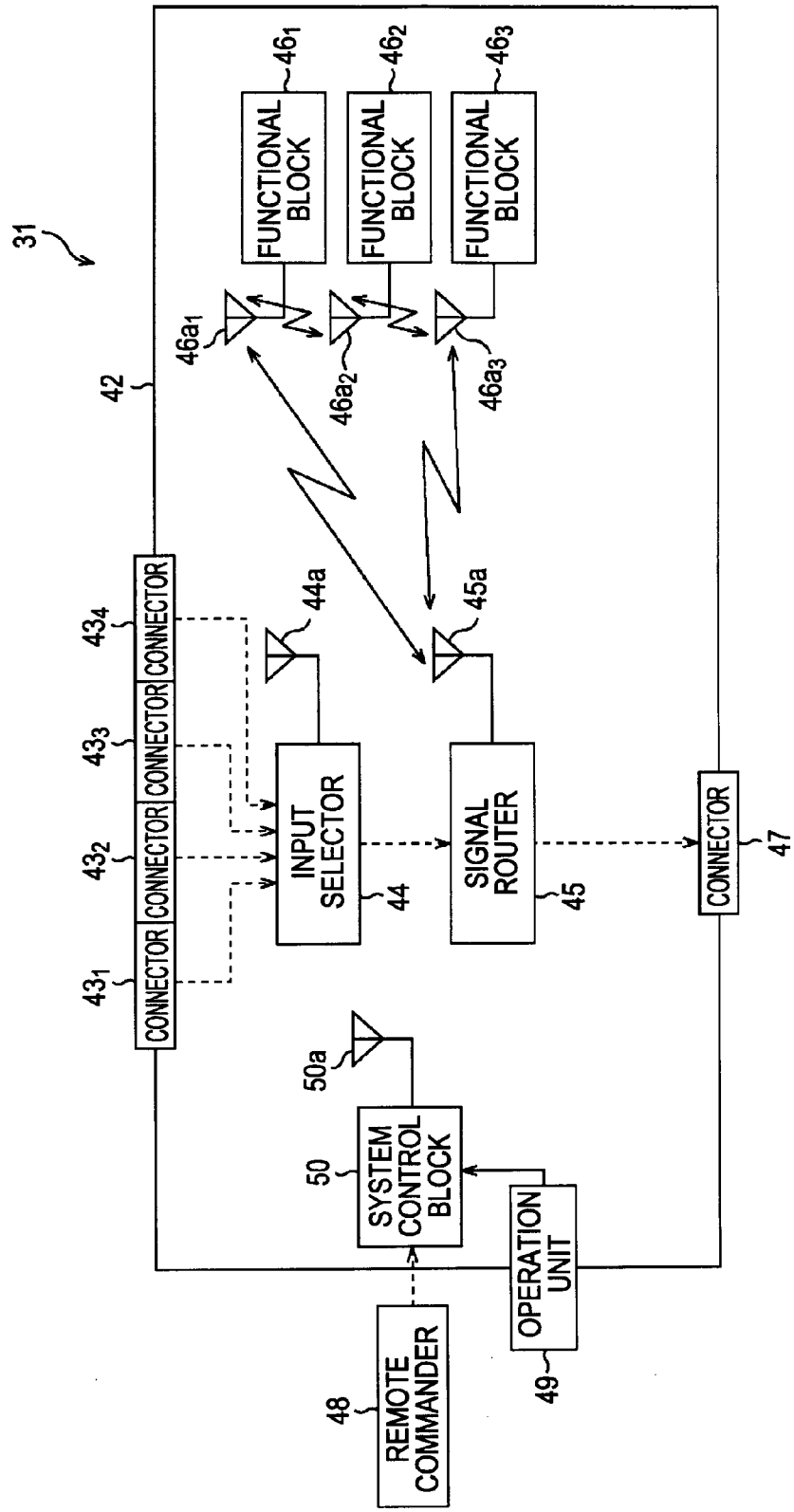
FIG. 3 is a block diagram illustrating a configuration of a signal processing apparatus according to an embodiment of the present invention.

FIG. 3 is a block diagram illustrating an example of a configuration of the signal processing apparatus 31 shown in FIG. 2.

As shown in FIG. 3, the signal processing apparatus 31 includes a case 42, connectors $43_1$ to $43_4$, an input selector 44, a signal router 45, functional blocks $46_1$ to $46_3$, a connector 47, a remote commander 48, an operation unit 49, and a system control block 50.

In the signal processing apparatus 31, the connectors $43_1$ to $43_4$ are connected to the input selector 44 via signal cables, the input selector 44 is connected to the signal router 45 via a signal cable, and the signal router 45 is connected to the connector 47 via a signal cable.

On the outer side of the case 42 corresponding to the case 32 shown in FIG. 2, the connectors $43_1$ to $43_4$, the connector 47, and the operation unit 49 are disposed. In the inside of the case 42, the input selector 44, the signal router 45, the functional blocks $46_1$ to $46_3$, and the system control block 50 are disposed.

The connectors $43_1$ to $43_4$ function to connect, via a cable, the signal processing apparatus 31 to an external apparatus (not shown) such as a tuner or a DVD player which supplies an image signal to the signal processing apparatus 31.

The input selector 44 is disposed, for example, on the input board 35 shown in FIG. 2, and includes an antenna 44a for communication with the system control block 50. Image signals are supplied from external apparatuses to the input selector 44 via the connectors $43_1$ to $43_4$. Under the control of the system control block 50, the input selector 44 selects one of the image signals supplied from the external apparatuses via the connectors $43_1$ to $43_4$, and the input selector 44 supplies the selected image signal to the signal router 45.

The signal router 45 is disposed, for example, on the output board 37 shown in FIG. 2, and includes an antenna 45a for communicating with the system control block 50 or the functional blocks $46_1$ to $46_3$. Under the control of the system control block 50, the signal router 45 supplies the image signal received from the input selector 44 to the functional blocks $46_1$ to $46_3$, by wireless communication using an electromagnetic wave, via the antenna 45a.

If the signal router 45 receives an image signal from one of the functional blocks $46_1$ to $46_3$ by wireless communication using an electromagnetic wave via the antenna 45a, the signal router 45 supplies the image signal received from one of the functional blocks $46_1$ to $46_3$ to the display (not shown) connected to the connector 47.

The functional blocks $46_1$ to $46_3$ are disposed on the respective signal processing boards $36_1$ to $36_3$ shown in FIG. 2, and the functional blocks $46_1$ to $46_3$ respectively include antennas $46a_1$ to $46a_3$.

If the functional blocks $46_1$ to $46_3$ receives an image signal transmitted from the signal router 45 by wireless communication using an electromagnetic wave via the antennas $46a_1$ to $46a_3$, the functional blocks $46_1$ to $46_3$ perform signal processing such as noise reduction, image conversion, or image correction on the received image signal. The functional blocks $46_1$ to $46_3$ transmit the resultant image signal to the signal router 45 by wireless communication using an electromagnetic wave via the antennas $46a_1$ to $46a_3$. Signal transmission is also possible among the functional blocks $46_1$ to $46_3$ via the antennas $46a_1$ to $46a_3$.

In the following discussion, when it is not necessary to distinguish the functional blocks $46_1$ to $46_3$ from each other, an expression "functional block 46" or "functional blocks 46" will be used. Similarly, an expression "antenna 46a" or "antennas 46a" will be used to describe the antennas $46_1$ to $46_3$ when it is not necessary to distinguish them from each other.

The connector 47 functions, as with the connector 19 shown in FIG. 1, to connect, via a cable, the signal processing apparatus 31 to the display for displaying an image in accordance with the image signal output from the signal processing apparatus 31.

The remote commander 48 and the operation unit 49 serve, as with the remote commander 20 or the operation unit 21 shown in FIG. 1, as a unit used by a user to generate and transmit an operation signal to the system control block 50.

The system control block 50 is disposed, for example, on the platform board 34 shown in FIG. 2, and includes an antenna 50a. If the system control block 50 receives the operation signal generated depending on the operation of the user from the remote commander 48 or the operation unit 49, the system control block 50 controls the input selector 44, the signal router 45, or the functional block 46 by wireless communication using an electromagnetic wave via the antenna 50a so that a process is performed in accordance with the operation signal.

In the signal processing apparatus 31, as described above, image signals are transmitted between the signal router 45 and functional blocks 46 by wireless communication using an electromagnetic wave within the case 42 of the signal processing apparatus 31.

In the wireless communication in the inside of the case 42, an electromagnetic wave radiated from the antenna 45a of the signal router 45 is reflected by walls or the like of the case 42. Thus, the electromagnetic wave is transmitted via multiple paths which can create a shift of the phase of the electromagnetic wave (signal) arriving at the functional blocks 46. The shift in phase can cause interference to occur among signals received by the functional block 46, and thus, the waveform of the signal is distorted by the interference. The distortion of the waveform can cause a symbol to be incorrectly discriminated.

Figure 4:
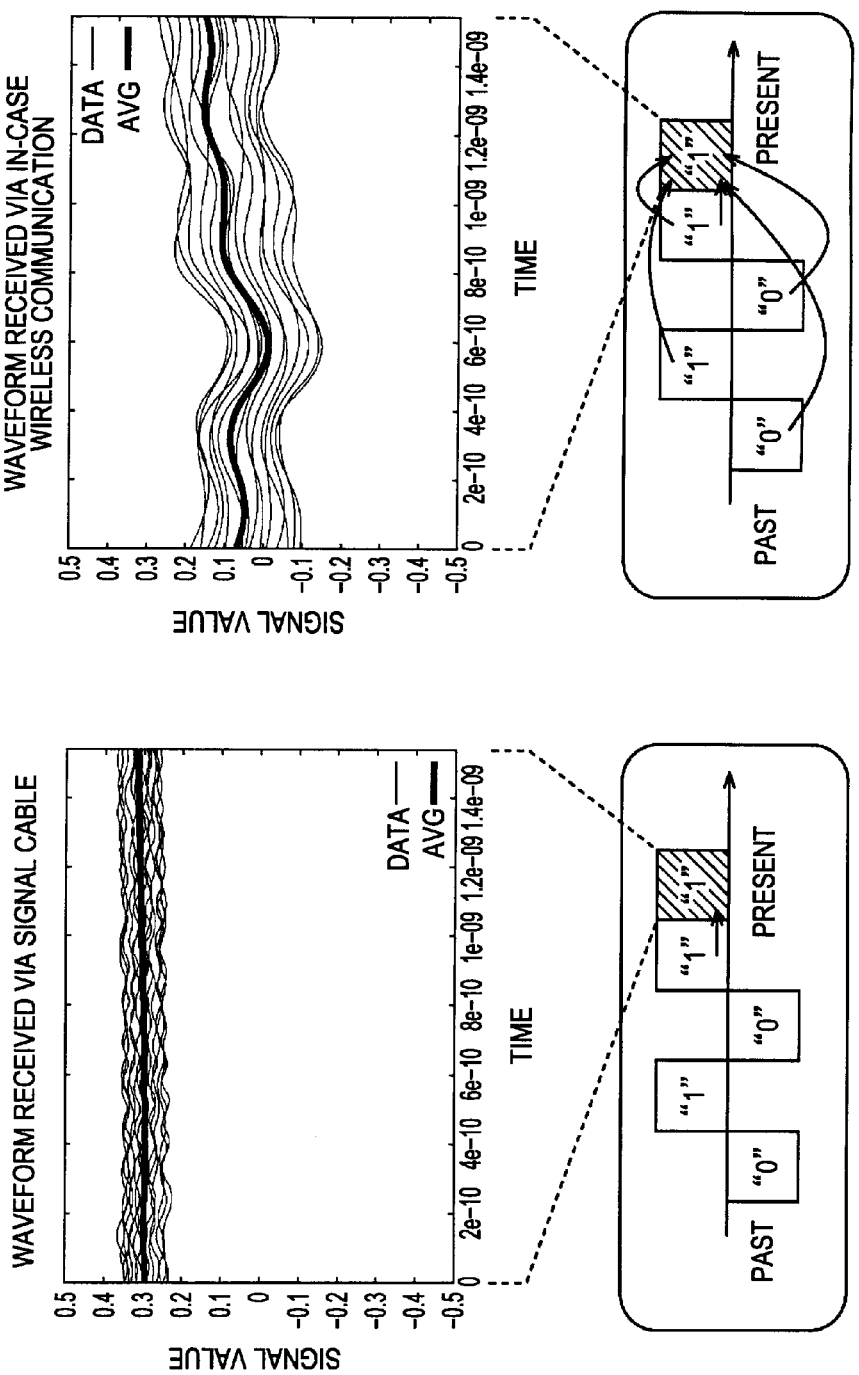
FIG. 4 is a diagram for explanation of distortion of a waveform represented by signal values of bits transmitted from a signal router to a functional block.

Referring to FIG. 4, distortion of a waveform of a signal transmitted by wireless communication in the case 42 is described.

Depending on the modulation method used in the wireless communication, one signal symbol can represent a plurality of bits. In the following discussion, one bit (0 or 1) is represented by one symbol, as with the case of a BPSK (binary phase shift keying) method. In the following explanation, by way of example, it is assumed that the signal is transmitted from the signal router 45 to a functional block 46. Note that in actual communication, signals are allowed to be transmitted between the signal router 45 and functional blocks 46 and among functional blocks 46.

In a lower left part of FIG. 4, a part of a signal transmitted from the signal router 45 to the functional block 46 is shown. The signal shown in the lower left of FIG. 4 includes a total of 5 bits from a bit 4 bits before the current bit to the current bit of the signal transmitted from the signal router 45. In the specific example shown in the lower part of FIG. 4, the signal includes 5 bits "0, 1, 0, 1, 1" (4 bits before, 3 bits before, 2 bits before, 1 bit before, and the current bit).

In an upper part of FIG. 4, a waveform of a signal received by the functional block 46 is shown. In FIG. 4, a horizontal axis represents time, and a vertical axis represents the signal value. In FIG. 4, thin lines (DATA) represent waveforms of original signals received by the functional block 46, and thick lines (AVG) represent average waveforms of the original signals.

In an upper right part of FIG. 4, a waveform of a current bit of a signal received via wireless communication by the functional block 46 is shown. In an upper left part of FIG. 4, a waveform of a current bit of a signal received by the functional block 46 from the signal router 45 via a signal cable is shown.

In the case where the signal is transmitted via the signal cable, when the current bit is "1", the average signal value is about 0.3 and the waveform has a nearly linear shape as shown in the upper left part of FIG. 4.

In contrast, in a case where a signal is transmitted by wireless communication in a closed system as is the case where a signal is transmitted within the case 42, an electromagnetic wave propagates with small scattering and small attenuation, and thus bits transmitted before the current bit, such as bits 4 bits to 1 bit before the current bit, propagate while being reflected by walls of the case 41 and reflected/diffracted by circuit boards or the like. As a result, bits 4 bits to 1 bit before the current bit arrive at delayed times and delayed signals are superimposed on the signal of the current bit. As a result, a change occurs in the signal value of the current bit.

Thus, as shown in an upper right part of FIG. 4, distortion occurs in the waveform represented by the signal value corresponding to the current bit received by the functional block 46 (hereinafter, such the waveform will be referred to simply as the waveform of the current bit). For example, when the true bit value is "1", if the signal is distorted into a value lower than a threshold value (i.e., 0) used in determination of the bit value, the bit value is incorrectly determined as "0".

However, as shown in the upper right part of FIG. 4, the change in the waveform due to the distortion is within a finite range and the distortion of the waveform occurs in a stationary manner.

In the inside of the case 32 of the signal processing apparatus 31, as shown in FIG. 2, the power supply module 33, the platform board 34, the input board 35, the signal processing boards $36_1$ to $36_3$, and the output board 37 are disposed at fixed locations. Therefore, the electromagnetic wave is reflected in a stationary manner by the walls of the case 32 or the circuit boards, and thus the interference by the reflected electromagnetic wave, that is, the influence of the multiple paths, occurs in a stationary manner. Thus, distortion of the waveform of the current bit occurs in a stationary manner.

Thus, for example, in the case where the sequence of bits from 4 bits before the current bit to the current bit is "0, 1, 0, 1, 1" as shown in the lower part of FIG. 4, distortion of the waveform of the current bit occurs in a stationary manner as shown in the upper right part of FIG. 4.

Therefore, if characteristics of distortion of the waveform of the current bit, due to delayed arrivals, caused by multiple path transmission, of one or more bits transmitted before the current bit is stored in advance in the functional block 46 (hereinafter, it is assumed that such characteristics are given in the form of a delay profile), then the functional block 46 can correctly determine the bit value transmitted from the signal router 45 on the basis of the delay profile and the waveform of the current bit received from the signal router 45.

The delay profile can be acquired by transmitting, a plurality of times, a test pattern signal including a predetermined sequence of bits between the signal router 45 and the functional block 46 before the image signal is transmitted by wireless communication in the signal processing apparatus 31.

In a case where the test pattern signal includes 7 bits each of which can take "0" or "1", 128 (=$2^7$) different patterns may be employed as the test pattern signal (as with the case of a test pattern signal shown in FIG. 14), or only 7 patterns each of which has "1" at only one of the 7 bits may be employed as the test pattern signal.

More specifically, in the case where the test pattern signal includes 7 bits, the following 7 patterns may be used as the test pattern signal: "0, 0, 0, 0, 0, 0, 1", "0, 0, 0, 0, 0, 1, 0", "0, 0, 0, 0, 1, 0, 0", "0, 0, 0, 1, 0, 0, 0", "0, 0, 1, 0, 0, 0, 0", "0, 1, 0, 0, 0, 0, 0", and "1, 0, 0, 0, 0, 0, 0". Distortion of the waveform of the current bit is predicted on the basis of 7 delay profiles acquired via the 7 test pattern signals and a plurality of bits transmitted before the current bit (for example, by performing a calculation according to equation (1) as will be described later). The predicted distortion of the waveform of the current bit is removed, and a determination is made as to whether the current bit is "1" or "0" from the waveform no longer including the distortion.

Figure 5:
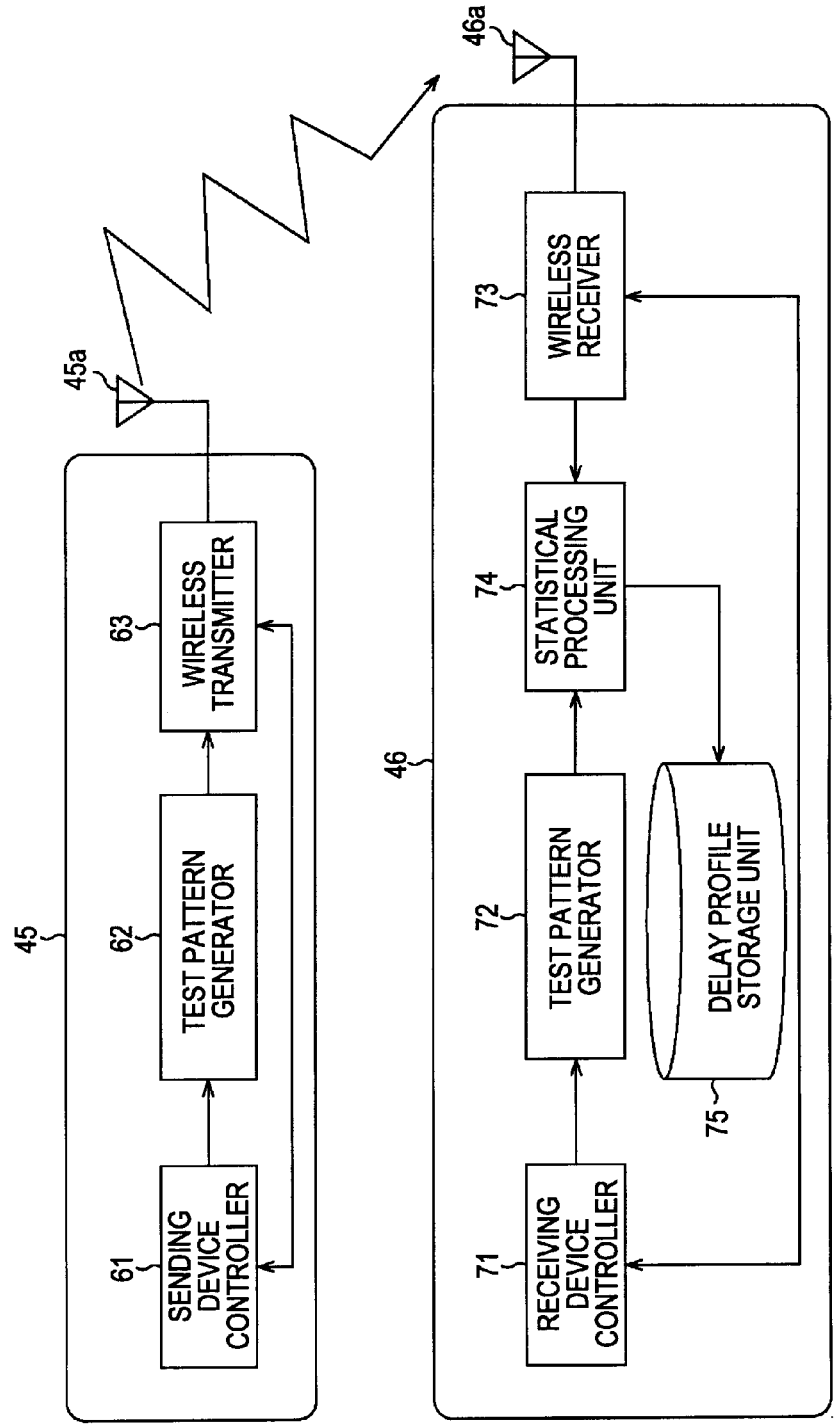
FIG. 5 is a block diagram illustrating an example of a configuration of a signal router and an example of a configuration of a functional block.

FIG. 5 is a block diagram illustrating an example of a configuration of the signal router 45 and an example of a configuration of the functional block 46 shown in FIG. 3.

Note that in FIG. 5, only blocks necessary for the signal router 45 to transmit a test pattern signal to the functional block 46, and block necessary for the functional block 46 to acquire a delay profile are shown.

In FIG. 5, the signal router 45 includes an antenna 45a, a sending device controller 61, a test pattern generator 62, and a wireless transmitter 63. The functional block 46 includes an antenna 46a, a receiving device controller 71, a test pattern generator 72, a wireless receiver 73, a statistical processing unit 74, and delay profile storage unit 75.

The sending device controller 61 controls the test pattern generator 62 to generate a test pattern signal, and controls the wireless transmitter 63 to transmit the test pattern signal generated by the test pattern generator 62 to the functional block 46. For example, in the case where the test pattern signal is formed to include 7 bits, the sending device controller 61 controls the test pattern generator 62 to generate 7 test pattern signals such as those described above.

The sending device controller 61 includes setting data, stored in advance therein, indicating combinations of bits used in the test pattern signals, the order of transmitting the test pattern signals, and the number of times each test pattern signal is transmitted.

Before the sending device controller 61 starts transmission of the test pattern signals, the sending device controller 61 transmits, via the wireless transmitter 63, a control signal (a command) to request to start the delay profile acquisition process to the functional block 46. Note that the control signal includes data specifying bit patterns of the test pattern signals.

In the case where a signal such as an image signal is transmitted at a high transmission rate, each bit is transmitted in a short period, and thus multiple transmission paths have a large influence on distortion of the signal, which leads to a large influence on the determination of bits represented by the signal. In contrast, in the case where a signal such as a control signal to start a process is transmitted at a low transmission rate, a rather long period can be assigned to each bit and thus multiple transmission paths have a small influence on distortion of the signal and have a small influence on the determination of bits represented by the signal. Therefore, when the sending device controller 61 transmits a control signal by wireless communication, if the transmission rate is low enough, the functional block 46 can correctly receive the control signal.

Alternatively, the sending device controller 61 may be connected to the receiving device controller 71 via a control bus (not shown) whereby the sending device controller 61 may transmit the control signal to the receiving device controller 71 via the control bus.

Under the control of the sending device controller 61, the test pattern generator 62 generates a test pattern signal and supplies it to the wireless transmitter 63.

The wireless transmitter 63 transmits the control signal supplied from the sending device controller 61 or the test pattern signal supplied from the test pattern generator 62 to the functional block 46 via the antenna 45a.

The receiving device controller 71, as with the sending device controller 61, includes setting data, stored in advance therein, indicating combinations of bits used in the test pattern signals, the order of transmitting the test pattern signals, and the number of times each test pattern signal is transmitted. If the receiving device controller 71 receives, from the signal router 45 via the wireless receiver 73, a control signal indicating that the delay profile acquisition process should be started, the receiving device controller 71 controls the test pattern generator 72 to generate a test pattern signal specified by the control signal in accordance with the setting.

Under the control of the receiving device controller 71, the test pattern generator 72 generates the test pattern signal and supplies it to the statistical processing unit 74.

The wireless receiver 73 receives the control signal or the test pattern signal transmitted from the signal router 45 via the antenna 46a. The received control signal is transferred to the receiving device controller 71. The wireless receiver 73 extracts the signal value of the current bit from the test pattern signal transmitted from the signal router 45, and the wireless receiver 73 supplies the extracted signal value to the statistical processing unit 74.

If the statistical processing unit 74 receives, from the signal router 45 via the wireless receiver 73, the signal value of the current bit of the test pattern, the statistical processing unit 74 acquires a delay profile based on the signal value of the current bit.

That is, if the delay profile acquisition process has been performed and acquired delay profiles are already stored in the delay profile storage unit 75, the statistical processing unit 74 reads a delay profile corresponding to the test pattern signal supplied from the test pattern generator 72 from the delay profile storage unit 75. The statistical processing unit 74 then performs a statistical process on the signal value of the current bit supplied from the wireless receiver 73 and the delay profile read from the delay profile storage unit 75. More specifically, for example, the statistical processing unit 74 calculates the average value of the signal value of the current bit and the delay profile, and employs the resultant average value as a new delay profile.

On the other hand, if no delay profile is stored in the delay profile storage unit 75, the statistical processing unit 74 employs the signal value of the current bit supplied from the wireless receiver 73 as the delay profile.

The statistical processing unit 74 supplies the delay profile acquired by the statistical processing unit 74 to the delay profile storage unit 75 together with the test pattern signal supplied from the test pattern generator 72.

The receiving device controller 71 controls the test pattern generator 72 to generate the test pattern signal in accordance with the same setting as that used in the generation of the test pattern signal by the test pattern generator 62 under the control of the sending device controller 61. Therefore, the values of bits of the test pattern signal used by the statistical processing unit 74 in the acquisition of the delay profile are equal to the values of bits of the test pattern signal supplied to the statistical processing unit 74 from the test pattern generator 72.

The statistical processing unit 74 performs the above-described process for all test pattern signals transmitted from the signal router 45 to acquire delay profiles corresponding to the respective test pattern signals.

Thus, as described above, the statistical processing unit 74 acquires the delay profiles indicating the characteristics of the distortion of the waveform of the current bit of the test pattern signals, which occurs due to delays of bits transmitted before the current bit in the test pattern signals in wireless communication performed in the inside of the case 42.

The delay profile storage unit 75 stores the delay profile supplied from the statistical processing unit 74 in association with the test pattern signal.

Figure 6:
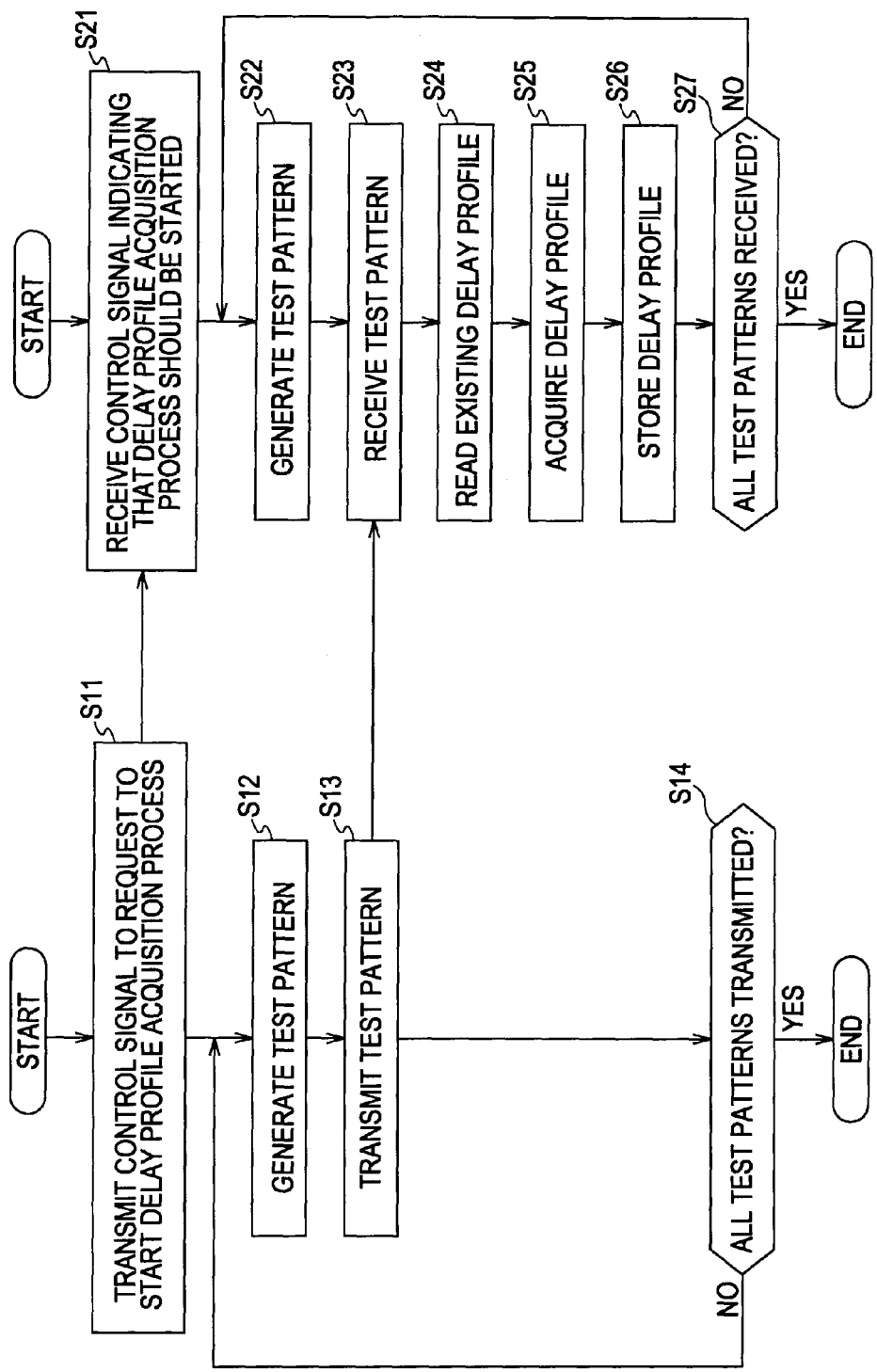
FIG. 6 is a flow chart illustrating a process in which a signal router transmits a test pattern signal and a functional block acquires a delay profile.

FIG. 6 is a flow chart illustrating a process in which the signal router 45 shown in FIG. 5 transmits the test pattern signal and the functional block 46 acquires the delay profile.

For example, when the signal processing apparatus 31 shown in FIG. 3 is set such that the delay profile acquisition process is performed when the signal processing apparatus 31 is initialized.

When a circuit board or the like is added to the signal processing apparatus 31, if a user turns on the power of the signal processing apparatus 31 to initialize the signal processing apparatus 31, the process shown in FIG. 6 is started. In step S11, the sending device controller 61 of the signal router 45 supplies, to the wireless transmitter 63, a control signal (a command) indicating that the delay profile acquisition process should be started. The wireless transmitter 63 transmits the received control signal to the functional block 46.

After step S11, the process proceeds to step S12. In step S12, the sending device controller 61 controls the test pattern generator 62 to generate a test pattern signal specified as to be transmitted first. Under the control of the sending device controller 61, the test pattern generator 62 generates the test pattern signal and supplies it to the wireless transmitter 63. The process then proceeds to step S13.

In step S13, the wireless transmitter 63 transmits the test pattern signal supplied in step S12 from the test pattern generator 62 to the functional block 46. The process then proceeds to step S14.

In step S14, the sending device controller 61 determines whether the transmission of test pattern signals from the wireless transmitter 63 to the functional block 46 is completed for all test pattern signals. For example, in a case where each test pattern signal includes 7 bits, the sending device controller 61 determines whether the transmission of test pattern signals to the functional block 46 is completed for all 7 test pattern signals.

In a case where the determination in step S14 by the sending device controller 61 is that the transmission of test pattern signals from the wireless transmitter 63 to the functional block 46 is not completed for all test pattern signals, the process returns to step S12. In step S12, the sending device controller 61 controls the test pattern generator 62 to generate a next test pattern signal specified as to be transmitted following the test pattern signal transmitted in step S13 from the wireless transmitter 63, and the process described above is repeated.

On the other hand, in a case where the determination in step S14 by the sending device controller 61 is that the transmission of test pattern signals from the wireless transmitter 63 to the functional block 46 is completed for all test pattern signals, the process performed by the signal router 45 is ended.

Meanwhile, the functional block 46 is waiting for arrival of the control signal indicating that the delay profile acquisition process should be started, from the signal router 45. If the signal router 45 transmits in step S11 the control signal indicating that the delay profile acquisition process should be started, then in step S21, the wireless receiver 73 receives this control signal and transfers it to the receiving device controller 71.

After step S21, the process proceeds to step S22. In step S22, the receiving device controller 71 controls the test pattern generator 72 to generate the same test pattern signal as that specified as to be transmitted first from the signal router 45. Under the control of the sending device controller 71, the test pattern generator 72 generates the test pattern signal and supplies it to the statistical processing unit 74. The process then proceeds to step S23.

In step S23, the wireless receiver 73 waits until the wireless receiver 73 receives the test pattern signal from the signal router 45. If the signal router 45 transmits in step S13 the test pattern signal, the wireless receiver 73 receives this test pattern signal. The wireless receiver 73 extracts the signal value of the current bit from the test pattern signal transmitted from the signal router 45, and the wireless receiver 73 supplies the extracted signal value to the statistical processing unit 74. The process then proceeds to step S24.

In step S24, the statistical processing unit 74 reads, from the delay profile storage unit 75a, a delay profile corresponding to the test pattern signal supplied in step S22 from the test pattern generator 72, and the process then proceeds to step S25. On the other hand, if no delay profile is stored in the delay profile storage unit 75, the process proceeds to step S25 without performing step S24.

In step S25, the statistical processing unit 74 performs the statistical process on the signal value of the current bit supplied in step S23 from the wireless receiver 73 and the delay profile read in step S24 from the delay profile storage unit 75. More specifically, for example, the statistical processing unit 74 calculates the average value of the signal value of the current bit and the delay profile, and employs the resultant average value as a new delay profile. In the case where the process proceeds to step S25 without performing step S24, the statistical processing unit 74 employs the signal value of the current bit supplied in step S23 from the wireless receiver 73 as the delay profile.

After step S25, the process proceeds to step S26. In step S26, the statistical processing unit 74 stores the delay profile acquired in step S25 into the delay profile storage unit 75. The process then proceeds to step S27.

In step S27, the receiving device controller 71 determines whether the reception of test pattern signals from the signal router 45 is completed for all test pattern signals.

In a case where the receiving device controller 71 determines in step S27 that the reception of test pattern signals from the signal router 45 is not completed for all test pattern signals, the process returns to step S22. In step S22, the receiving device controller 71 controls the test pattern generator 72 to generate a next test pattern signal specified as to be transmitted from the signal router 45 following the test pattern signal received in step S23 by the wireless receiver 73, and the process described above is repeated.

On the other hand, in a case where the determination in step S27 by the receiving device controller 71 is that the reception of test pattern signals from the signal router 45 is completed for all test pattern signals, the process is ended.

As described above, the signal router 45 transmits the test pattern signal, while the functional block 46 receives the test pattern signal transmitted from the signal router 45 acquires the delay profile on the basis of the received test pattern signal. Note that because the delay profiles are based on the steady-state characteristic of the wireless communication performed in the inside of the case 42, the functional block 46 can acquire high-quality robust values simply by acquiring the delay profiles in the startup process of the like.

Figure 7:
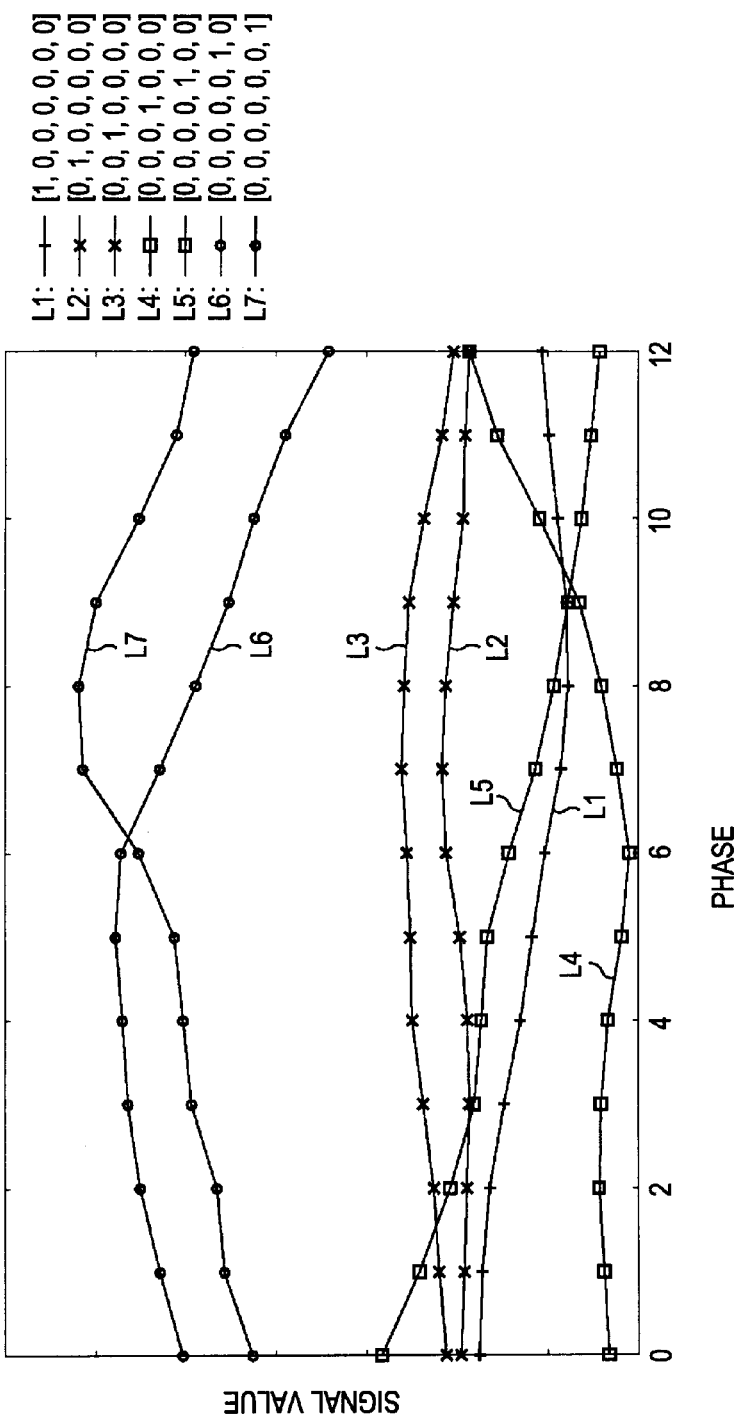
FIG. 7 illustrates an example of a delay profile acquired by a functional block.

FIG. 7 illustrates an example of a set of delay profiles acquired by the functional block 46 shown in FIG. 5.

In FIG. 7, a horizontal axis represents the phase of delay profiles, and vertical axis represents signal values of delay profiles. In the example of a set of delay profiles shown in FIG. 7, delay profiles L1 to L7 acquired on the basis of the 7-bit test pattern signals are shown. Herein it is assumed that the delay profiles L1 to L7 are acquired by sampling the signal value of the current bit of the test pattern signal at 13 sampling points.

In the example of a set of delay profiles shown in FIG. 7, the delay profile L1 is acquired on the basis of a test pattern signal "1, 0, 0, 0, 0, 0, 0", the delay profile L2 is acquired on the basis of a test pattern signal "0, 1, 0, 0, 0, 0, 0", the delay profile L3 is acquired on the basis of a test pattern signal "0, 0, 1, 0, 0, 0, 0", the delay profile L4 is acquired on the basis of a test pattern signal "0, 0, 0, 1, 0, 0, 0", the delay profile L5 is acquired on the basis of a test pattern signal "0, 0, 0, 0, 1, 0, 0", the delay profile L6 is acquired on the basis of a test pattern signal "0, 0, 0, 0, 0, 1, 0", and the delay profile L7 is acquired on the basis of a test pattern signal "0, 0, 0, 0, 0, 0, 1".

Using the delay profiles described above, the functional block 46 detects the bit value of the signal transmitted from the signal router 45 and received by the functional block 46 (hereinafter, this signal will be referred to simply as the received signal).

More specifically, the functional block 46 estimates the distortion of the waveform of the current bit on the basis of the signal value of the delay profile and the bit value transmitted before the current bit. The functional block 46 removes the distortion estimated as occurring in the waveform of the current bit from the waveform of the current bit of the received signal, the functional block 46 determines the value of the current bit of the received signal, from the resultant waveform no longer including the distortion (hereinafter, referred to as the distortion-removed waveform).

For example, the signal value $y_k'$ of the distortion predicted to occur, at the phase of k, in the current bit due to the influences of the values of the bit n bits before the current bit to the bit 1 bit before the current bit can be calculated according to equation (1) shown below:

$$y_k' = a_{1,k}x_1 + a_{2,k}x_2 + \ldots + a_{n,k}x_n \qquad (1)$$

where $x_n$ denotes a bit transmitted n bits before the current bit, and $a_{n,k}$ denotes a signal value at a phase k of a delay profile determined on the basis of a test pattern signal for a bit of "1" transmitted n bits before the current bit.

The signal values $y_0'$ to $y_k'$ of the predicted distortion at phases 0 to k (phases 0 to 12 in the example shown in FIG. 7) are given by the following equation:

$$\begin{bmatrix} y_1' \\ \vdots \\ y_k' \end{bmatrix} = \begin{bmatrix} a_{1,1} & \cdots & a_{n,1} \\ \vdots & \ddots & \\ a_{1,k} & & a_{n,k} \end{bmatrix} \cdot \begin{bmatrix} x_1 \\ \vdots \\ x_n \end{bmatrix} \qquad (2)$$

where $x_n = +1$ when a bit transmitted n bits before the current bit is "1", while $x_n = +1$ when the bit transmitted n bits before the current bit is "0". In equation (2), a matrix whose elements $a_{n,k}$ indicate signal values of phase k of the delay profile is referred to as a received signal amplification prediction coefficient matrix.

The signal value $S_k$ of the distortion-removed waveform at the phase k, that is, the signal value $S_k$ of the waveform obtained by removing the predicted distortion from the waveform of the current bit of the received signal can be determined by subtracting the signal value $y_k'$ of the predicted distortion at the phase k from the signal value $y_k$ of the current bit of the received signal at the phase k, in accordance with equation (3) shown below.

$$S_k = y_k - y_k' \qquad (3)$$

Note that because the waveform of the current bit of the received signal is the sum of the waveform corresponding to the true value of the current bit and the distortion created by the influence of bits transmitted before the current bit, the distortion-removed waveform obtained by removing the predicted distortion from the waveform of the current bit of the received signal represents the waveform corresponding to the true value of the current bit.

Therefore, when the current bit of the received signal is "1", the signal value $S_k$ of the distortion-removed waveform is substantially equal to the signal value $a_{0,k}$ of the delay profile at the phase k determined from the test pattern signal for the current bit of "1". On the other hand, when the current bit of the received signal is "0", the signal value $S_k$ of the distortion-removed waveform is substantially equal to the signal value $a_{0,k}$ of the delay profile at the phase k determined from the test pattern signal for the current bit of "0". Note that the received signal includes noise such as thermal noise added thereto when the signal is transmitted via the transmission paths, there is a slight difference between the signal value $S_k$ of the distortion-removed waveform and the signal value $a_{0,k}$.

Therefore, when the current bit of the received signal is "1", if the signal value $a_{0,k}$ of the delay profile at the phase k determined from the test pattern signal for the current bit of "1" is subtracted from the signal value $S_k$ of the distortion-removed waveform, then the resultant value (hereinafter, referred to as a comparison value $B_1$) is nearly equal to 0. The comparison value $B_1$ is given by equation (4) shown below.

$$B_1 = S_k - a_{0,k} \quad (4)$$

The delay profile at the phase k determined from the test pattern signal for the current bit of "0" is obtained by inverting the delay profile at the phase k determined from the test pattern signal for the current bit of "1". Therefore, the value (comparison value $B_0$) obtained by subtracting the signal value $a_{0,k}$ of the delay profile at the phase k determined from the test pattern signal for the current bit "0" from the signal value $S_k$ of the distortion-removed waveform can be obtained by adding the signal value $a_{0,k}$ of the delay profile at the phase k determined from the test pattern signal for the current bit "1" to the signal value $S_k$ of the distortion-removed waveform. When the current bit of the received signal is "0", the comparison value $B_0$ is nearly equal to 0. The comparison value $B_0$ is given by equation (5) shown below.

$$B_0 = S_k + a_{0,k} \quad (5)$$

The functional block 46 calculates the comparison value $B_1$ and the comparison value $B_0$ and compares the comparison value $B_1$ and the comparison value $B_0$ with 0. If the comparison value $B_1$ is closer to 0 than the comparison value $B_0$, it is determined that the current bit is "1". Conversely, if the comparison value $B_0$ is closer to 0 than the comparison value $B_1$, it is determined that the current bit is "0". Using a plurality of bits already determined in the above-described manner, the functional block 46 determines whether there is an error in determined bit values. If an error is detected for the value of a bit, the value of this bit is corrected and the result is output.

Figure 8:
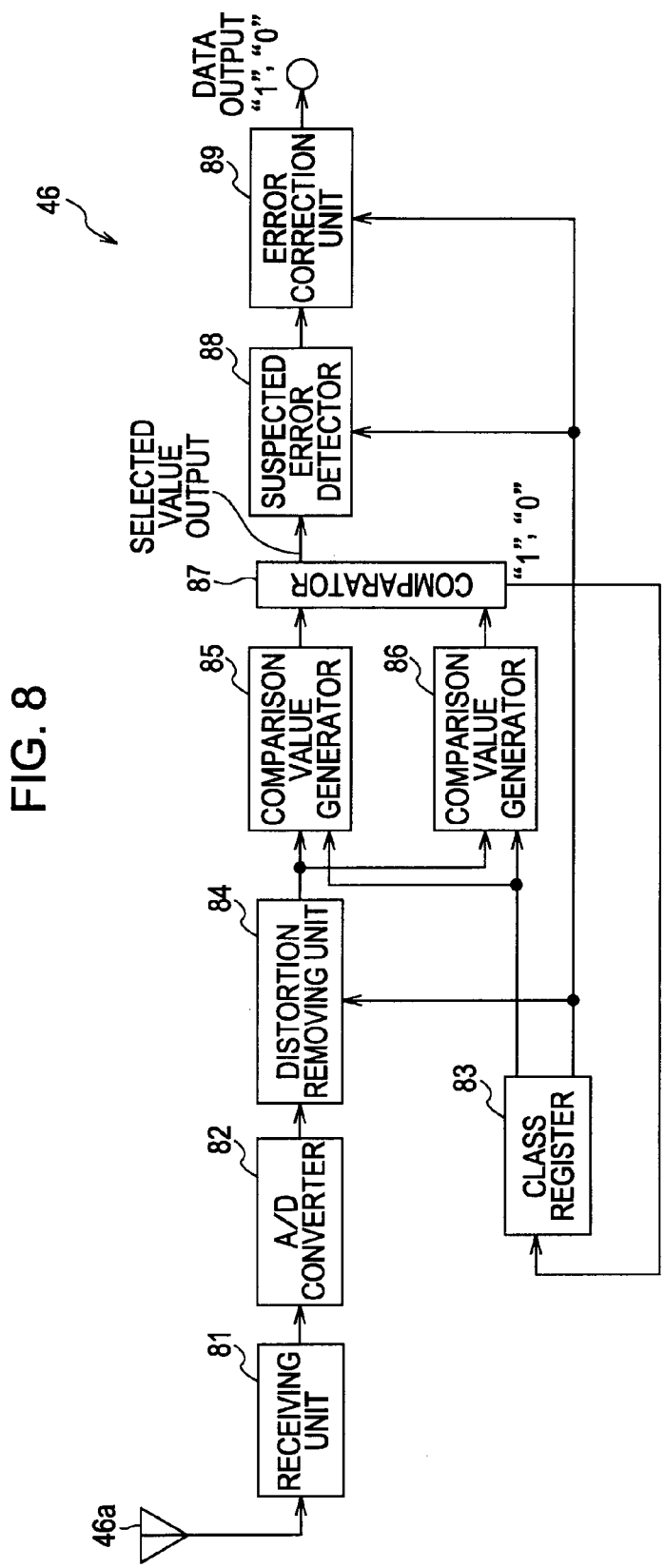
FIG. 8 is a block diagram illustrating an example of a functional block.

FIG. 8 is a block diagram illustrating an example of a configuration of the functional block 46 shown in FIG. 3. Note that in FIG. 8, only blocks necessary for the functional block 46 to determine the value of the bit of the received signal and correct an error in already-determined bit values are shown.

In the example shown in FIG. 8, the functional block 46 includes an antenna 46a, a receiving unit 81, an A/D (analog-to-digital) converter 82, a class register 83, a distortion removing unit 84, a comparison value generators 85 and 86, a comparator 87, a suspected error detector 88, and an error correction unit 89.

The receiving unit 81 is connected to the antenna 46a. The antenna 46a is adapted to receive a RF signal transmitted from the signal router 45 and supply the received RF signal to the receiving unit 81. The receiving unit 81 multiplies the RF signal supplied from the antenna 46a by a signal with a predetermined frequency thereby converting the RF signal into a baseband signal. The receiving unit 81 converts the RF signal received by the antenna 46a into a baseband signal, i.e., into a received signal, and supplies the resultant signal to the analog-to-digital converter 82.

The analog-to-digital converter 82 converts the received signal supplied from the receiving unit 81 into a digital form thereby acquiring the signal value of the received signal. The acquired signal value of the received signal is supplied to the distortion removing unit 84. In the above process, the analog-to-digital converter 82 quantizes values obtained by sampling (over-sampling) the signal value of each bit of the received signal at a sampling frequency higher than the bit rate thereby obtaining signal values at a plurality of sampling points. Thus, a waveform of the received signal is obtained.

The bit value determined by the comparator 87 is supplied to the class register 83. The class register 83 stores values of bits from a bit n bits before the current bit to a bit 1 bit before the current bit, and supplies them to the distortion removing unit 84 and the error correction unit 89 as required. The class register 83 also stores the value of the current bit used by the comparison value generators 85 and 86 to calculate the comparison values, and supplies "1" as the value of the current bit to the comparison value generator 85 and "0" to the comparison value generator 86.

The distortion removing unit 84 receives the signal value of the current bit of the received signal from the analog-to-digital converter 82 and values of the bit n bit before the current bit to the bit 1 bit before the current bit from the class register 83. The distortion removing unit 84 reads a delay profile from the delay profile storage unit 75 shown in FIG. 5.

Using the delay profile read from the delay profile storage unit 75 and the bit values supplied from the class register 83, the distortion removing unit 84 calculates equation (1) described above to determine the distortion predicted for the current bit due to the influence of the bit n bits before the current bit to the bit 1 bit before the current bit. Furthermore, the distortion removing unit 84 calculates equation (3) to determine the signal value of the distortion-removed waveform obtained by subtracting the predicted distortion from the signal value of the current bit of the received signal supplied from the analog-to-digital converter 82. The distortion removing unit 84 supplies the signal value of the distortion-removed waveform to the comparison value generators 85 and 86.

The comparison value generator 85 receives "1" as the current bit from the class register 83 and the signal value of the distortion-removed waveform from the distortion removing unit 84. The comparison value generator 85 calculates the comparison value $B_1$ by subtracting the signal value of the delay profile determined from the test pattern signal for the current bit "1" from the signal value of the distortion-removed waveform supplied from the distortion removing unit 84. The calculated comparison value $B_1$ is supplied to the comparator 87.

The comparison value generator 86 receives "0" as the current bit from the class register 83 and the signal value of the distortion-removed waveform from the distortion removing unit 84. The comparison value generator 86 calculates the comparison value $B_0$ by subtracting the signal value of the delay profile determined from the test pattern signal for the current bit "0" from the signal value of the distortion-removed waveform or by adding the signal value of the delay profile determined from the test pattern signal for the current bit "1" to the signal value of the distortion-removed waveform. The calculated comparison value $B_0$ is supplied to the comparator 87.

The comparator 87 compares the comparison value $B_1$ supplied from the comparison value generator 85 and the comparison value $B_0$ supplied from the comparison value generator 86, and determines the value of the current bit on the basis of the comparison result.

For example, if the absolute value of the comparison value $B_1$ is greater than that of the comparison value $B_0$, the comparator 87 determines that the current bit is "1". In this case, the comparator 87 supplies "1" as the current bit to the class register 83 and supplies the comparison value $B_1$ to the suspected error detector 88. On the other hand, if the absolute value of the comparison value $B_1$ is equal to or smaller than that of the comparison value $B_0$, the comparator 87 determines that the current bit is "0". In this case, the comparator 87 supplies "0" as the current bit to the class register 83 and supplies the comparison value $B_0$ to the suspected error detector 88.

The suspected error detector 88 receives one of the comparison value $B_1$ and the comparison value $B_0$ from the comparator 87 and also receives values of the bit n bits before the current value to the bit 1 bit before the current bit from the class register 83. Using one of the comparison value $B_1$ and the comparison value $B_0$ supplied from the comparator 87, the values of the bit n bits before the current value to the bit 1 bit before the current bit supplied from the class register 83, and the delay profiles stored in the delay profile storage unit 75 shown in FIG. 5, the suspected error detector 88 generates an error suspicion level value indicating the degree of the likelihood that the value of the bit is incorrect, for each of the bit n bits before the current bit to the bit 1 bit before the current bit already determined by the comparator 87. The generated error suspicion level values are supplied to the error correction unit 89.

The error correction unit 89 reads the value of the bit corresponding to each error suspicion level value supplied from the suspected error detector 88 from the class register 83, and determines whether the value of the bit read from the class register 83 is correct or incorrect, according to the error suspicion level value. More specifically, for example, if the error suspicion level value supplied from the suspected error detector 88 is greater than or equal to a predetermined threshold value, the error correction unit 89 determines that the value of the bit read from the class register 83 is incorrect. In the case where the determination by the error correction unit 89 is that the value of the bit read from the class register 83 is incorrect, the error correction unit 89 corrects the error of the value of the bit and outputs the result. In the case where the determination by the error correction unit 89 is that the value of the bit read from the class register 83 is correct, the error correction unit 89 directly outputs the value determined by the comparator 87.

Figure 9:
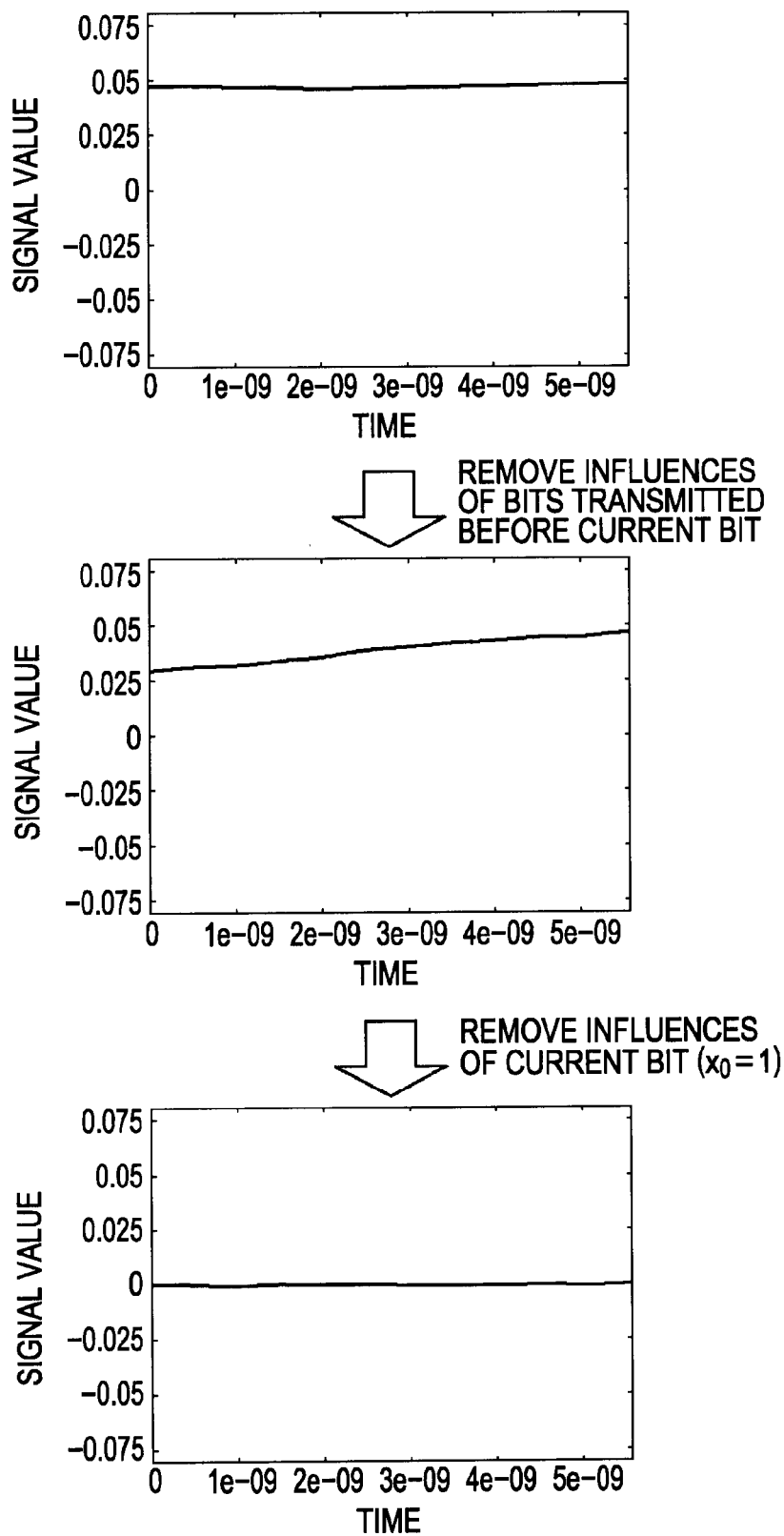
FIG. 9 shows an example of a waveform of a received signal, an example of a distortion-removed waveform, and an example of a waveform of a comparison value.

FIG. 9 shows an example of a received signal output from the analog-to-digital converter 82, an example of a distortion-removed waveform output from the distortion removing unit 84, and an example of a waveform of a comparison value output from the comparison value generator 85.

In a top area of FIG. 9, an example of a received signal is shown for a case where "0" was transmitted as a bit 2 bits before the current bit, "1" was transmitted as a bit 1 bit before the current bit, and the current bit is "1".

In a middle area of FIG. 9, shown is an example of a waveform obtained by removing, from the received signal waveform, distortion predicted to occurring in the received signal waveform due to influences of the bit "0" transmitted 2 bits before the current bit, and the bit "1" transmitted 1 bit before the current bit.

In a bottom area of FIG. 9, shown is an example of a waveform of a comparison value obtained by subtracting a delay profile, determined from a test pattern signal for a current bit "1", from the distortion-removed waveform. Because the true value of the current bit of the received signal is "1", the resultant comparison value is nearly equal to 0.

Figure 10:
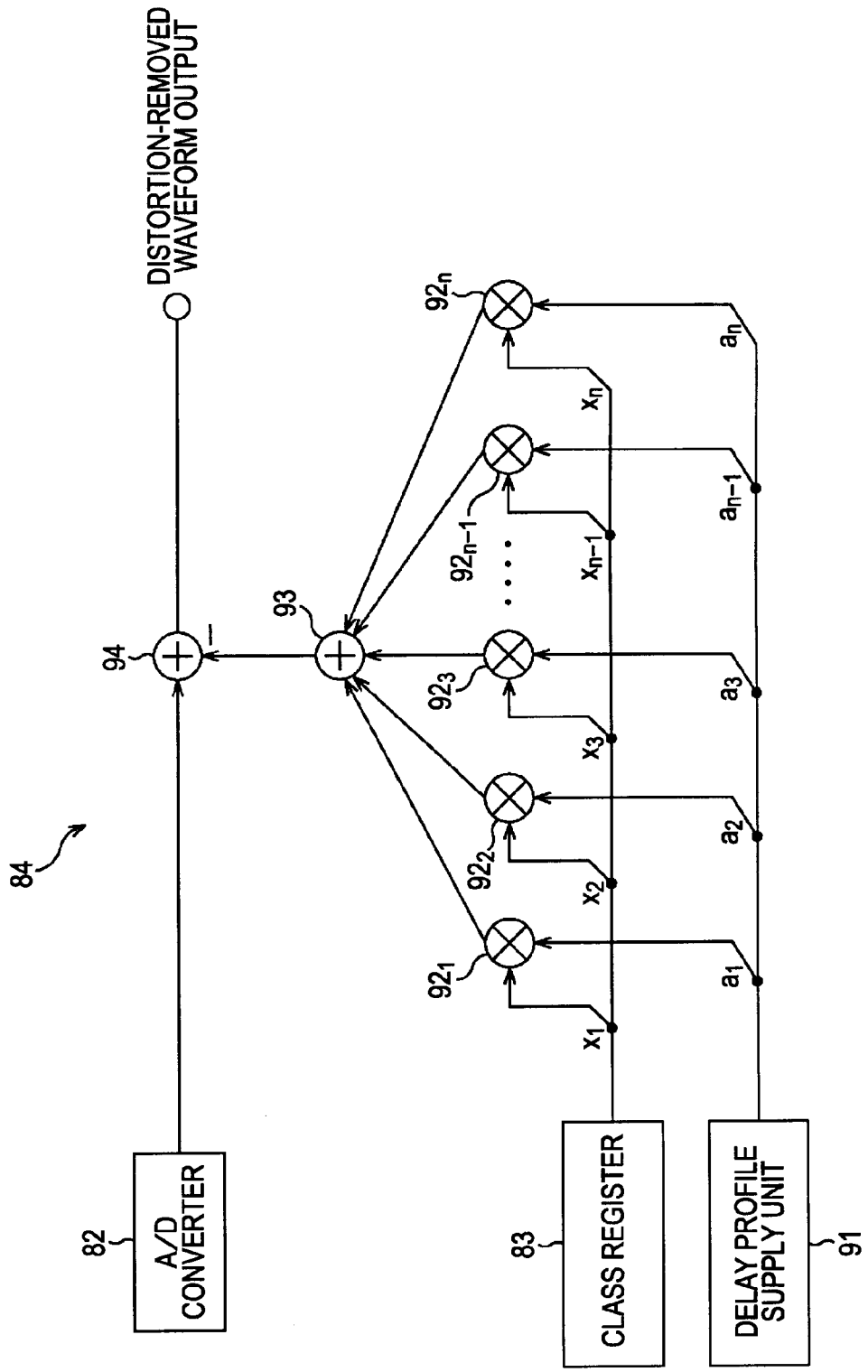
FIG. 10 is a block diagram illustrating an example of a configuration of a distortion removing unit.

FIG. 10 is a block diagram illustrating an example of a configuration of the distortion removing unit 84 shown in FIG. 8.

As shown in FIG. 10, the distortion removing unit 84 includes a delay profile supply unit 91, n multipliers $92_1$ to $92_n$, an adder 93, and a subtractor 94.

The delay profile supply unit 91 reads signal values $a_{1,k}$ to $a_{n,k}$ of the delay profile at a phase k stored in the delay profile storage unit 75 shown in FIG. 5, and supplies them to the respective multipliers $92_1$ to $92_n$. For example, the signal value $a_{i,k}$ is supplied to the i-th multiplier $92_i$.

The multipliers $92_1$ to $92_n$ are supplied with bits $x_1$ to $x_n$ transmitted 1 bit to n bits before the current but from the class register 83 shown in FIG. 8. More specifically, for example, the multiplier $92_i$ is supplied with the value of a bit i bits before the current bit from the class register 83, and the multiplier $92_i$ multiplies the bit $x_i$ supplied from the class register 83 by the signal value $a_{i,k}$ supplied from the delay profile supply unit 91, and supplies the resultant value $(a_{i,k} \cdot x_i)$ to the adder 93.

The adder 93 calculates the sum of values supplied from the multipliers $92_1$ to $92_n$ to determine the signal value $y_k'$ of distortion predicted to occur at the phase k in the current bit, and the adder 93 supplies the resultant signal value $y_k'$ to the subtractor 94.

The subtractor 94 is also supplied with a signal value $y_k$ from the analog-to-digital converter 82 shown in FIG. 8. The subtractor 94 subtracts the signal value $y_k'$ of the predicted distortion at the phase k supplied from the adder 93 from the signal value $y_k$ of the received signal supplied from the analog-to-digital converter 82. As a result, a signal value $S_k$ of the distortion-removed waveform is obtained and output.

Figure 11:
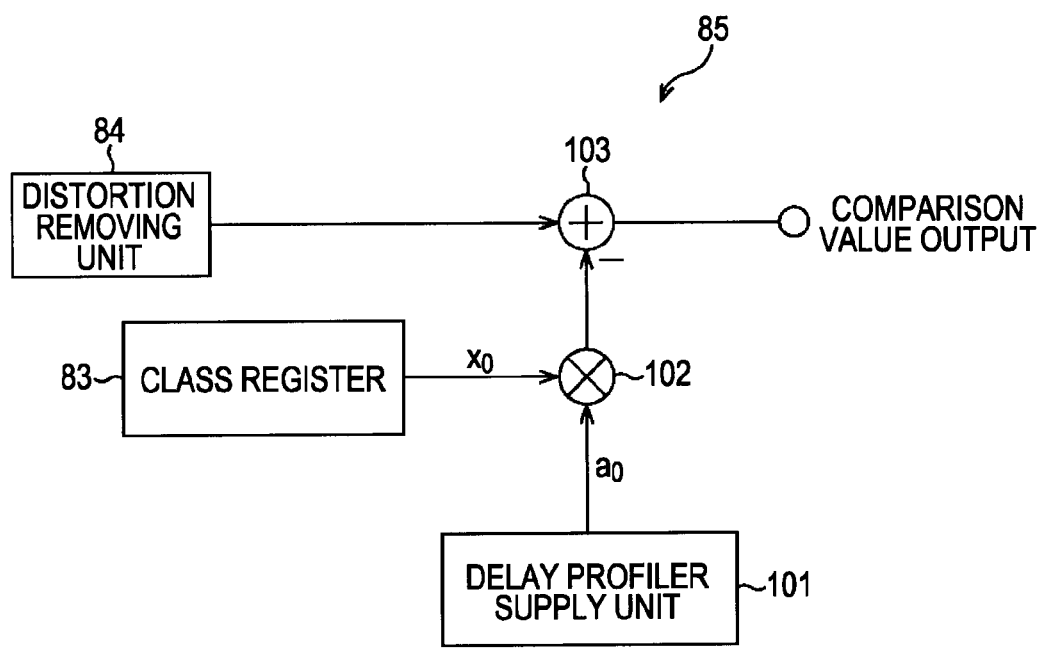
FIG. 11 is a block diagram illustrating an example of a configuration of a comparison value generator.

FIG. 11 is a block diagram illustrating an example of a configuration of the comparison value generator 85 shown in FIG. 8.

As shown in FIG. 11, the comparison value generator 85 includes a delay profile supply unit 101, a multiplier 102, and a subtractor 103.

The delay profile supply unit 101 reads a signal value $a_{0,k}$ of the delay profile at a phase k stored in the delay profile storage unit 75 shown in FIG. 5, and supplies the signal value $a_{0,k}$ to the multiplier 102.

The multiplier 102 is supplied with "1" as the value of the current bit (i.e., the current bit $x_0 = +1$) from the class register 83 shown in FIG. 8, and the multiplier 102 multiplies the signal value $a_{0,k}$ supplied from the delay profile supply unit 101 by the bit $x_0$ supplied from the class register 83. A resultant value $(+1 \times a_{0,k})$ is supplied to the subtractor 103.

The subtractor 103 is also supplied with the signal value $S_k$ of the distortion-removed waveform from the distortion removing unit 84 shown in FIG. 8, and the subtractor 103 subtracts the value supplied from the multiplier 102 from the signal value $S_k$ of the distortion-removed waveform supplied from the distortion removing unit 84, and the subtractor 103 outputs a resultant value as a comparison value $B_1$.

The comparison value generator 86 is configured in a similar manner to the comparison value generator 85. The comparison value generator 86 is supplied with "0" as the value of the current bit (i.e., the current bit $x_0 = -1$) from the class register 83, and the multiplier 102 multiplies the signal value $a_{0,k}$ supplied from the delay profile supply unit 101 by the bit $x_0$ supplied from the class register 83. A resultant value $(-1 \times a_{0,k})$ is supplied to the subtractor 103. The subtractor 103 adds the signal value $a_{0,k}$ to the signal value $S_k$ of the distortion-removed waveform supplied from the distortion removing unit 84, and the subtractor 103 outputs a resultant value as a comparison value $B_0$.

FIG. 12 is a block diagram illustrating an example of a configuration of the suspected error detector 88 shown in FIG. 8.

As shown in FIG. 12, the suspected error detector 88 includes a reference value evaluation unit 111, delay profile supply units $112_1$ to $112_n$, comparison value generators $113_1$ to $113_n$, and a selector 114.

In a case where the comparator 87 shown in FIG. 8 determines that the current bit is "1", the comparison value $B_1$ is supplied to the reference value evaluation unit 111 from the comparator 87. On the other hand, in a case where the comparator 87 determines that the current bit is "0", the comparison value $B_0$ is supplied to the reference value evaluation unit 111 from the comparator 87. The reference value evaluation unit 111 determines whether the comparison value supplied from the comparator 87 is smaller than or equal to a predetermined threshold value.

In a case where it is determined that the comparison value supplied from the comparator 87 is smaller than or equal to the predetermined threshold value, the reference value evaluation unit 111 notifies the selector 114 that the bits from the bit n bits before the current bit to the current bit do not include a bit suspected to be incorrect. On the other hand, in a case where it is determined that the comparison value supplied from the comparator 87 is greater than the predetermined threshold value, the reference value evaluation unit 111 supplies the comparison value (the comparison value $B_1$ or the comparison value $B_0$) received from the comparator 87 to the comparison value generators $113_1$ to $113_n$ and the selector 114, for use as a reference value used in producing an error suspicion level value indicating the degree of likelihood that the value of each bit determined by the comparator 87 is incorrect.

The delay profile supply units $112_1$ to $112_n$ read signal values $a_{1,k}$ to $a_{n,k}$ of the delay profile at a phase k stored in the delay profile storage unit 75 shown in FIG. 5, and supplies them to the respective comparison value generators $113_1$ to $113_n$. More specifically, the i-th delay profile supply unit 112i supplies the signal value $a_{i,k}$ to the i-th comparison value generator $113_i$.

The comparison value generators $113_1$ to $113_n$ are supplied with the reference value from the reference value evaluation unit 111 and also supplied with the signal values $a_{1,k}$ to $a_{n,k}$ of the delay profile at the phase k from the delay profile supply units $112_1$ to $112_n$. Using the reference value (i.e., one of the comparison value $B_1$ and the comparison value $B_0$) and the signal value $a_{i,k}$ of the delay profile at the phase k, the comparison value generator $113_i$ calculates the comparison value obtained for the case where the value of the bit i bits before the current bit is inverted, and the comparison value generator $113_i$ supplies the calculated comparison value to the selector 114.

More specifically, in the case where the calculation of the distortion-removed waveform performed by the distortion removing unit 84 shown in FIG. 8 is based on the assumption that the value of the bit i bits before the current bit was "1" and the calculations of the comparison value performed by the comparison value generators 85 and 86 are based on the distortion-removed waveform calculated based on the above assumption, the comparison value generator $113_i$ calculates the comparison value based on the assumption that the value of the bit i bits before the current bit was "0". In the case where the comparison value $B_1$ is supplied as the reference value from the reference value evaluation unit 111 to the comparison value generator $113_i$, the comparison value determined by the comparison value generator $113_i$ is based on the assumption that the current bit is "1". On the other hand, in the case where the comparison value $B_0$ is supplied as the reference value from the reference value evaluation unit 111 to the comparison value generator $113_i$, the comparison value determined by the comparison value generator $113_i$ is based on the assumption that the current bit is "0".

In the case where the information supplied from the reference value evaluation unit 111 indicates that the bits from the bit n bits before the current bit to the current bit do not include a bit suspected to be incorrect, the selector 114 does not increment the error suspicion level values, stored in the form of the error suspicion table (FIG. 15), associated with the bits from the bit n bits before the current bit and the bit 1 bit before the current bit.

If the selector 114 receives the reference value from the reference value evaluation unit 111 and the comparison values from the comparison value generators $113_1$ to $113_n$, the selector 114 selects a bit suspected to be incorrect, on the basis of the received reference value and the comparison values. The selector 114 then increments the error suspicion level value associated with the bit selected as the suspicious bit from the bits from the bit n bits before the current bit and the bit 1 bit before the current bit.

The selector 114 supplies the error suspicion level value associated with the bit n bits before the current bit to the error correction unit 89 shown in FIG. 8.

Figure 13:
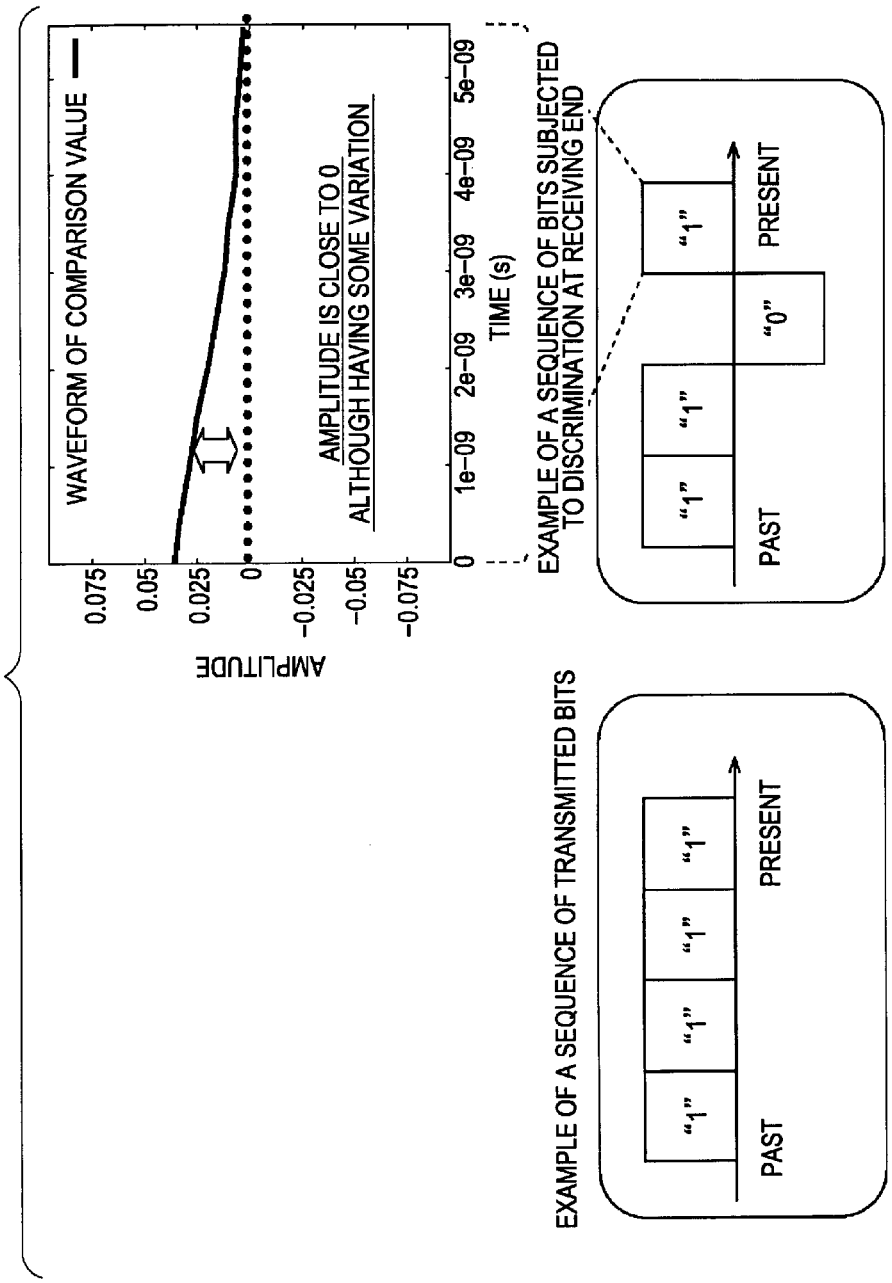
FIG. 13 is a diagram for explanation of a comparison value calculated by a comparison value generator.
Figure 14:
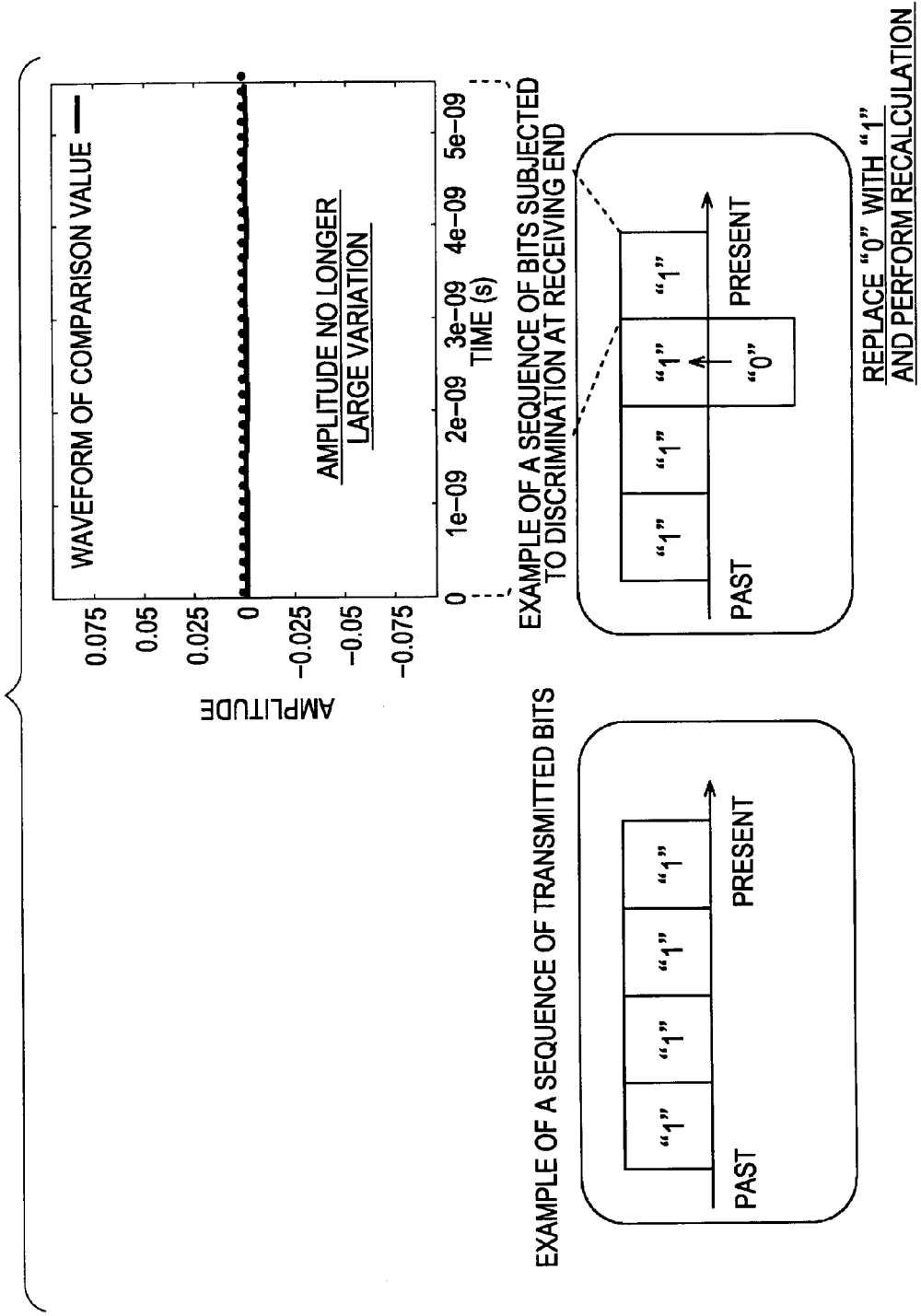
FIG. 14 is a diagram for explanation of a comparison value calculated by a comparison value generator.

Referring to FIGS. 13 and 14, the comparison values calculated by the comparison value generators $113_1$ to $113_n$ shown in FIG. 12 are described in further detail below.

For example, when a sequence of bits "1, 1, 1, 1" is transmitted from the signal router 45, if the comparator 87 in the functional block 46 determines that a sequence of bits of a received signal is "1, 1, 0, 1", then the comparison value supplied from the comparator 87 to the reference value evaluation unit 111 of the suspected error detector 88 has a waveform such as that shown in FIG. 13.

As can be seen from the example shown in FIG. 13, the waveform of the comparison value obtained in this situation is close to 0 but has some variation. If the variation in the value of the waveform is greater than a predetermined value, the reference value evaluation unit 111 determines that the comparison value supplied from the comparator 87 is greater than a predetermined threshold value. In this case, the reference value evaluation unit 111 supplies, to the comparison value generators $113_1$ to $113_n$, the comparison value for use as a reference value in generating error suspicion level values indicating the degree of suspicion that the values of the respective bits already determined by the comparator 87 are incorrect.

FIG. 14 illustrates an example of a waveform of the comparison value determined by the comparison value generator $113_1$ using the values of the sequence of bits which are different from the values already determined by the comparator 87 in that the value of the bit immediately before the current bit is inverted, that is, using the values of the sequence of bits assumed to be "1, 1, 1, 1". In this case, as can be seen from FIG. 14, the comparison value is substantially equal to 0, and the waveform of the comparison value does not have a change in amplitude. In this case, the sequence of bits "1, 1, 1, 1" used by the comparison value generator $113_1$ in the calculation of the comparison value is exactly the same as the sequence of bits actually transmitted from the signal router 45, and thus the comparison value determined by the comparison value generator $113_1$ is the smallest of values, including the reference value supplied from the reference value evaluation unit 111 and the comparison values determined by the comparison value generators $113_2$ to $113_n$.

The inverted bit in the sequence of bits used in the calculation of the smallest comparison value, i.e., the bit immediately before the current bit in this specific case, is regarded as an incorrectly-determined bit, and the selector 114 selects this bit as a suspicious bit looking incorrect. Accordingly, the selector 114 increments the error suspicion level value associated with the bit immediately before the current bit.

Figure 15:
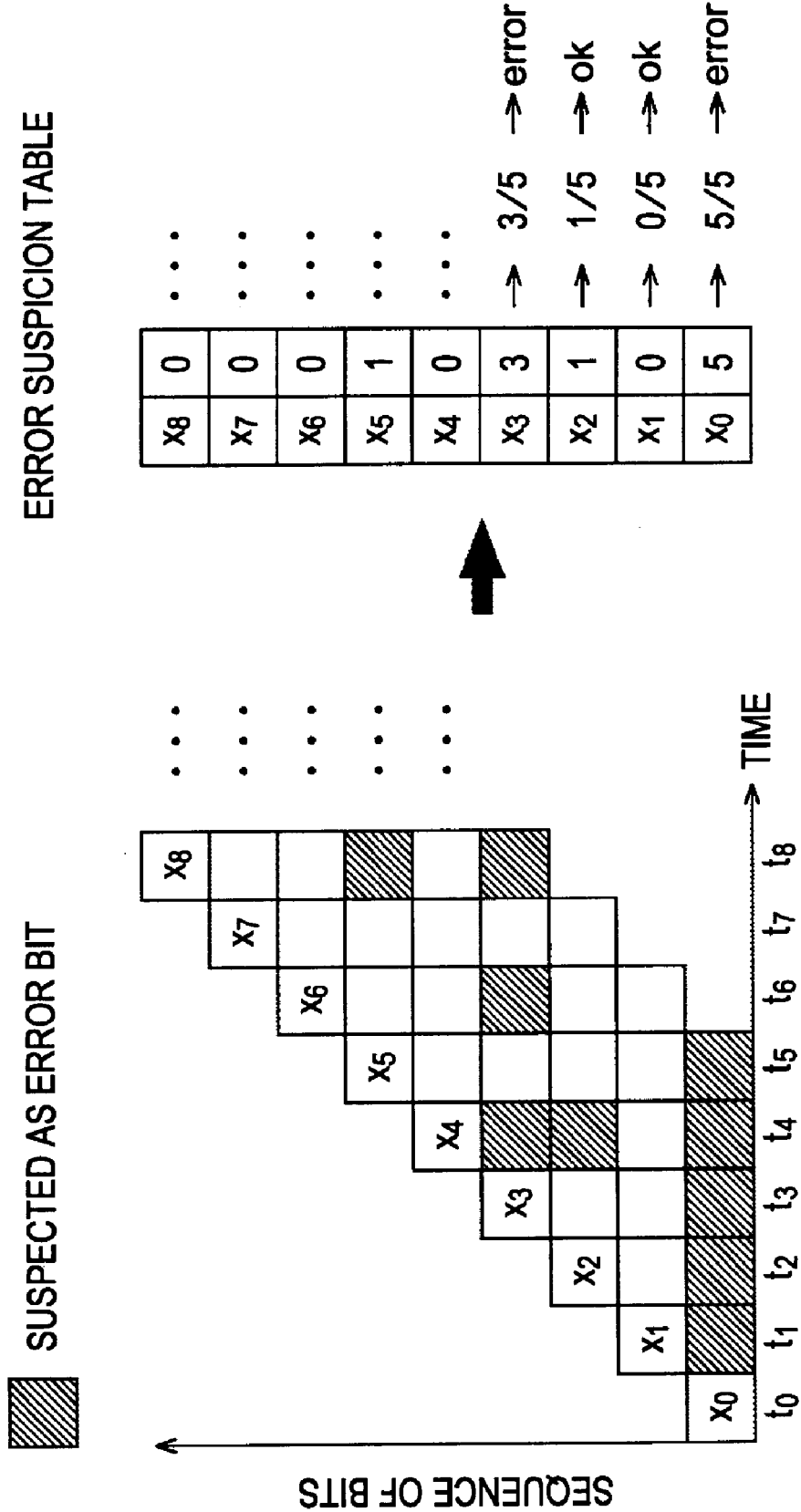
FIG. 15 is a diagram for explanation of error suspicion level values generated by a suspected error detector.

Referring to FIG. 15, error suspicion level values generated by the suspected error detector 88 are described below.

A change in a sequence of bits with the passage of time is shown on the left-hand side of FIG. 15, and an error suspicion table is shown on the right-hand side of FIG. 15.

In the example shown in FIG. 15, suspicious bits looking incorrect are selected for a sequence of bits from a bit 5 bits before the current bit to a bit 1 bit before the current bit, error suspicion level values are determined according to the selection result.

More specifically, the left-hand part of FIG. 15 shows whether a bit $x_i$ received at a time $t_i$ was selected as a suspicious bit looking incorrect in a duration from a time $t_{i+1}$ to a time $t_{i+5}$. In boxes located at time $t_{i+1}$ to time $t_{i+5}$ in a horizontal line of each bit $x_i$, shaded boxes indicate that the bit $x_i$ was selected as a suspicious bit looking incorrect.

For example, a bit $x_0$ received at a time $t_0$ was selected as a suspicious bit at each time from $t_1$ to $t_5$. A bit $x_2$ received at a time $t_2$ was selected as a suspicious bit at a time $t_4$. A bit $x_3$ received at a time $t_3$ was selected as a suspicious bit at times $t_4$, $t_6$, and $t_8$. A bit $x_3$ received at a time $t_5$ was selected as a suspicious bit at a time $t_8$.

On the right-hand side of FIG. 15, shown is an error suspicion table in which bits received at respective times and error suspicion level values there of are represented in the form of a table. In this specific example shown in FIG. 15, the error suspicion table shows that the bit $x_0$ has an error suspicion level value of 5, the bit $x_2$ has an error suspicion level value of 1, the bit $x_3$ has an error suspicion level value of 3, and the bit $x_5$ has an error suspicion level value of 1. The other bits, that is, the bit $x_1$, the bit $x_4$, the bit $x_6$, the bit $x_7$, and the bit $x_8$ have an error suspicion level value of 0.

For example, the error correction unit 89 may be configured to make a determination as to whether each bit is correct or incorrect such that if the number of times the bit was regarded as being incorrect is greater than the number of times the bit was not regarded as being incorrect, the bit is determined to be incorrect. More specifically, in the present example, the error correction unit 89 determines that the bit $x_0$ and the bit $x_3$ are incorrect, while the bit $x_1$ and the bit $x_2$ are correct. Note that the bit $x_4$ and bits following the bit $x_4$ are subjected to the determination as to whether they are correct or incorrect when the suspected error detector 88 has determined the error suspicion level value thereof at times after $t_8$.

FIG. 16 is a flow chart illustrating a process performed by the functional block 46 shown in FIG. 8 to determine values of bits of a received signal and correct an error if an error is detected in the already-determined values.

If a RF signal transmitted from the signal router 45 is received by the antenna 46a and supplied to the receiving unit 81, then in step S31, the receiving unit 81 converts the RF signal received by the antenna 46a into a baseband signal and supplies the resultant baseband signal as the received signal to the analog-to-digital converter 82.

After step S31, the process proceeds to step S32. In step S32, the analog-to-digital converter 82 converts the received signal supplied from the receiving unit 81 into a digital form to acquire the signal value of the received signal. The analog-to-digital converter 82 supplies the signal value of the received signal to the distortion removing unit 84. The process then proceeds to step S33.

In step S33, the class register 83 supplies values of a bit n bits before the current bit to a bit 1 bit before the current bit to the distortion removing unit 84. The distortion removing unit 84 calculates the predicted distortion using the delay profiles stored in the delay profile storage unit 75 shown in FIG. 5 and the bit values supplied from the class register 83. The distortion removing unit 84 then removes the predicted distortion from the received signal supplied in step S32 from the analog-to-digital converter 82 thereby determining the signal value of the distortion-removed waveform. The resultant signal value of the distortion-removed waveform is supplied to the comparison value generators 85 and 86.

After step S33, the process proceeds to step S34. In step S34, the comparison value generator 85 calculates the comparison value $B_1$ by subtracting the signal value of the delay profile determined from the test pattern signal for the current bit "1" from the signal value of the distortion-removed waveform supplied from the distortion removing unit 84. The comparison value generator 85 supplies the calculated comparison value $B_1$ to the comparator 87. The process then proceeds to step S35.

In step S35, the comparison value generator 86 calculates the comparison value $B_0$ by subtracting the signal value of the delay profile determined from the test pattern signal for the current bit "1" from the signal value of the distortion-removed waveform supplied from the distortion removing unit 84, and the comparison value generator 86 supplies the calculated comparison value $B_0$ to the comparator 87.

After step S35, the process proceeds to step S36. In step S36, the comparator 87 compares the square of the comparison value $B_1$ supplied from the comparison value generator 85 with the square of the comparison value $B_0$ supplied from the comparison value generator 86 to determine whether the square of the comparison value $B_0$ is smaller than or equal to the square of the comparison value $B_1$.

In a case where the determination made in step S36 by the comparator 87 is that the square of the comparison value $B_0$ is smaller than or equal to the square of the comparison value $B_1$, the process proceeds to step S37. In step S37, the comparator 87 determines that the current bit is "0", and supplies the comparison value $B_0$ to the suspected error detector 88.

In a case where the determination made in step S36 by the comparator 87 is that the square of the comparison value $B_0$ is greater than the square of the comparison value $B_1$, the process proceeds to step S38. In step S38, the comparator 87 determines that the current bit is "1", and supplies the comparison value $B_1$ to the suspected error detector 88.

After step S37 or S38, the process proceeds to step S39. In step S39, the comparator 87 supplies the value of the current bit determined in step S37 or S38 to the class register 83 to store it therein. The process then proceeds to step S40.

In step S40, using one of the comparison value $B_1$ supplied in step S37 from the comparator 87 and the comparison value $B_0$ supplied in step S38 from the comparator 87, the values of the bit n bits before the current value to the bit 1 bit before the current bit supplied from the class register 83, and the delay profiles stored in the delay profile storage unit 75 shown in FIG. 5, the suspected error detector 88 generates an error suspicion level value indicating the degree of the likelihood that the value of a bit is incorrect, for each of the bit n bits before the current bit to the bit 1 bit before the current bit already determined by the comparator 87. The generated error suspicion level values are supplied to the error correction unit 89.

After step S40, the process proceeds to step S41. In step S41, the error correction unit 89 reads the value of the bit corresponding to each error suspicion level value supplied from the suspected error detector 88 from the class register 83, and determines whether the value of the bit read from the class register 83 is correct or incorrect, according to the error suspicion level value. In the case where the determination by the error correction unit 89 is that the value of the bit read from the class register 83 is incorrect, the error correction unit 89 corrects the value of the bit read from the class register 83 and outputs the corrected value. On the other hand, in the case where the determination by the error correction unit 89 is that the value of the bit read from the class register 83 is correct, the error correction unit 89 directly outputs the value of the bit read from the class register 83. The processing flow then returns to step S33 to repeat the above-described process for a next bit supplied from the analog-to-digital converter 82.

Figure 17:
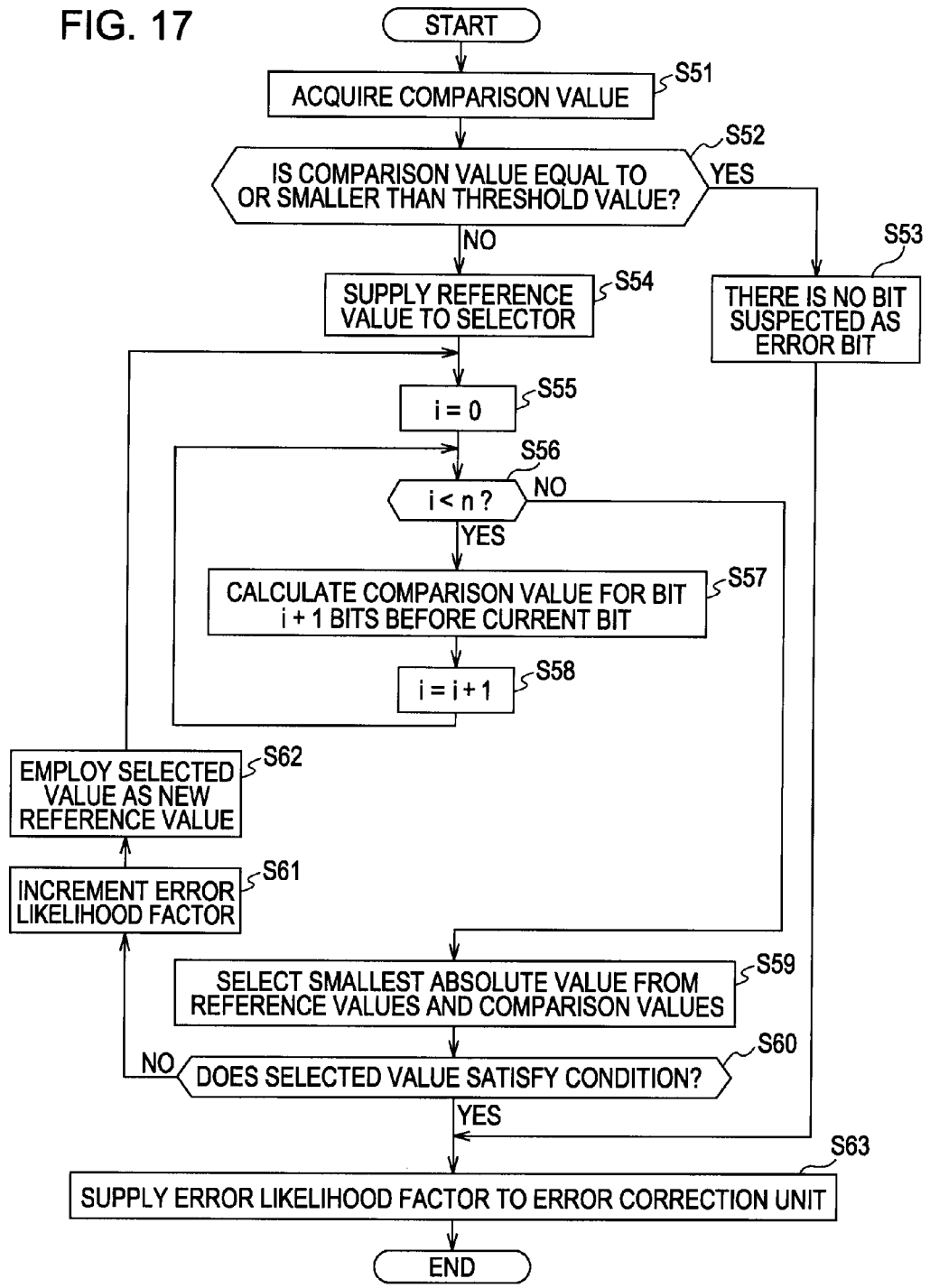
FIG. 17 is a flow chart illustrating a process performed by a suspected error detector.

FIG. 17 is a flow chart illustrating a process performed in step S40 shown in FIG. 16 by the suspected error detector 88.

In step S51, the reference value evaluation unit 111 of the suspected error detector 88 receives the comparison value (the comparison value $B_1$ or the comparison value $B_0$) from the comparator 87 shown in FIG. 8. The process then proceeds to step S52.

In step S52, the reference value evaluation unit 111 of the suspected error detector 88 determines whether the comparison value supplied in step S51 from the comparator 87 is smaller than or equal to the predetermined threshold value.

In a case where the determination made in step S52 by the reference value evaluation unit 111 is that the comparison value supplied from the comparator 87 is smaller than or equal to the predetermined threshold value, the process proceeds to step S53. In step S53, the reference value evaluation unit 111 notifies the selector 114 that the bits from the bit n bits before the current bit to the current bit do not include a bit suspected to be incorrect. The process then proceeds to step S63.

On the other hand, in a case where the determination made in step S52 by the reference value evaluation unit 111 is that the comparison value supplied from the comparator 87 is greater than the predetermined threshold value, the process proceeds to step S54. In step S54, the reference value evaluation unit 111 supplies the comparison value received from the comparator 87 to the selector 114, for use as a reference value used in producing an error suspicion level value indicating the degree of likelihood that the value of each bit determined by the comparator 87 is incorrect.

After step S54, the process proceeds to step S55. In step S55, the reference value evaluation unit 111 resets a variable i. More specifically, the reference value evaluation unit 111 sets 0 as an initial value into the variable i.

After step S55, the process proceeds to step S56. In step S56, the reference value evaluation unit 111 determines whether the variable i is smaller than the number, n, of bits to be subjected to the determination as to whether the bits are correct or incorrect.

In a case where the determination made in step S56 by the reference value evaluation unit 111 is that the variable i is smaller than the number, n, of bits to be subjected to the determination as to whether the bits are correct or incorrect, the process proceeds to step S57. In step S57, the reference value evaluation unit 111 supplies the reference value to the comparison value generator $113_{i+1}$. The comparison value generator $113_{i+1}$ calculates the comparison value using values of the sequence of bits in which the value of the bit i+1 bits before the current bit is inverted. The comparison value generator $113_{i+1}$ supplies the calculated comparison value to the selector 114.

After step S57, the process proceeds to step S58. In step S58, the reference value evaluation unit 111 increments the variable i by 1. The process then returns to step S56.

On the other hand, in a case where the determination made in step S56 by the reference value evaluation unit 111 is that the variable i is not smaller than the number, n, of bits to be subjected to the determination as to whether the bits are correct or incorrect, the process proceeds to step S59. Thus, the process from step S56 to S58 is performed repeatedly until comparison values are calculated by all comparison value generators $113_1$ to $113_n$ and supplied to the selector 114.

In step S59, the selector 114 selects the smallest value from the group consisting of the reference value supplied in step S54 from the reference value evaluation unit 111 and the comparison values supplied in step S57 from the comparison value generators $113_1$ to $113_n$.

After step S59, the process proceeds to step S60. In step S60, the selector 114 determines whether the value selected in the immediately previous step S59 satisfies one of the following first to third conditions.

The first condition is that the value selected in step S59 is smaller than or equal to the predetermined threshold value (the threshold value used in the determination in step S52), the second condition is that the value selected in step S59 is the reference value supplied in step S54 from the reference value evaluation unit 111, and the third condition is that the value selected in step S59 is a comparison value calculated using values of a sequence of bits in which the bit corresponding to the comparison value selected in step S59 is inverted.

In a case where the determination made in step S60 by the selector 114 is that the value selected in the immediately previous step S59 does not satisfy any of the first to third conditions described above, the process proceeds to step S61.

In step S61, the selector 114 increments the error suspicion level value of the bit corresponding to the selected comparison value calculated by one of the comparison value generators $113_1$ to $113_n$. More specifically, for example, when the comparison value calculated by the comparison value generator $113_i$ is selected, the error suspicion level value of the bit i bits before the current bit is incremented.

After step S61, the process proceeds to step S62. In step S62, the selector 114 supplies the value selected in step S59 as a new reference value to the reference value evaluation unit 111. The processing flow then returns to step S55 to repeat the above-described process from step S55.

On the other hand, in a case where the determination made in step S60 by the selector 114 is that the value selected in the immediately previous step S59 satisfies one of the first to third conditions described above, the process proceeds to step S63. In step S63, the selector 114 supplies the error suspicion level value associated with a bit n bits before the current bit to the error correction unit 89. The process is then ended.

As described above, the functional block 46 determines the value of the current bit on the basis of the result of the comparison between the comparison value $B_1$ and the comparison value $B_0$ determined from the distortion-removed value of the received signal, and thus it is possible to correctly determine the value of the current bit regardless of the distortion of the waveform of the signal value of the current bit. Furthermore, the functional block 46 recalculates the comparison value on the basis of the already-determined values of the predetermined number of bits (from the bit n bits before the current bit to the bit 1 bit before the current bit), and determines whether there is an incorrect bit. Thus, when the already-determined bits include an error, it is possible to correct the error. Thus, high communication quality can be achieved.

In a conventional wireless communication system, data is divided into a plurality of blocks and data is transmitted from a transmitting end together with error correction code added to each block. In a receiving end, if an error is detected in a block, the error is corrected using the error correction code, and the original signal is reproduced from the blocks. In contrast, in the signal processing apparatus 31 according to the present embodiment of the invention, true values of bits can be determined using delay profiles, and thus high-reliability communication is achieved simply by transmitting a sequence of bits from the signal router 45 and simply receiving the transmitted sequence of bits by the functional block 46 and determining the true values of the bits. This makes it possible to achieve short and steady delays, that is, real-time communication can be achieved. Besides, because it is not necessary to perform the error correction process, the apparatus can be configured in a simple form.

In some conventional wireless communication systems, a UW is inserted in a packet to handle the multipath problem. In contrast, in the signal processing apparatus 31 according to the present embodiment of the invention, high communication quality can be achieved using the delay profiles without having to insert UW in packets. This allows a reduction in overhead on packets, and thus allows high-speed communication.

Because the signal processing apparatus 31 is configured such that a sequence of signal bits is transmitted in a similar manner to a signal processing apparatus configured to transmit signals via a signal cable, an inter-board harness or connector used in a conventional signal processing apparatus can be easily replaced by a wireless communication system using the signal processing apparatus 31. The production of the signal processing apparatus 31 does not includes a harness connection process which is necessary in production of the conventional signal processing apparatus.

Although in the above explanation, it is assumed that a signal is transmitted from the signal router 45 to the functional block 46, the invention can also be applied to a case where a signal is transmitted from the functional block 46 to the signal router 45 or a signal is transmitted between different functional blocks 46. The invention makes it possible to correctly determine the value of the current bit in such cases.

In the embodiments described above, the error suspicion level value for a bit is given by the number of times that the bit has been selected as a suspicious bit looking incorrect by the selector 114 of the suspected error detector 88. Alternatively, the error suspicion level value for a bit may be given by a predetermined weight times the number of times that the bit has been selected as a suspicious bit looking incorrect by the selector 114 of the suspected error detector 88.

Figure 18:
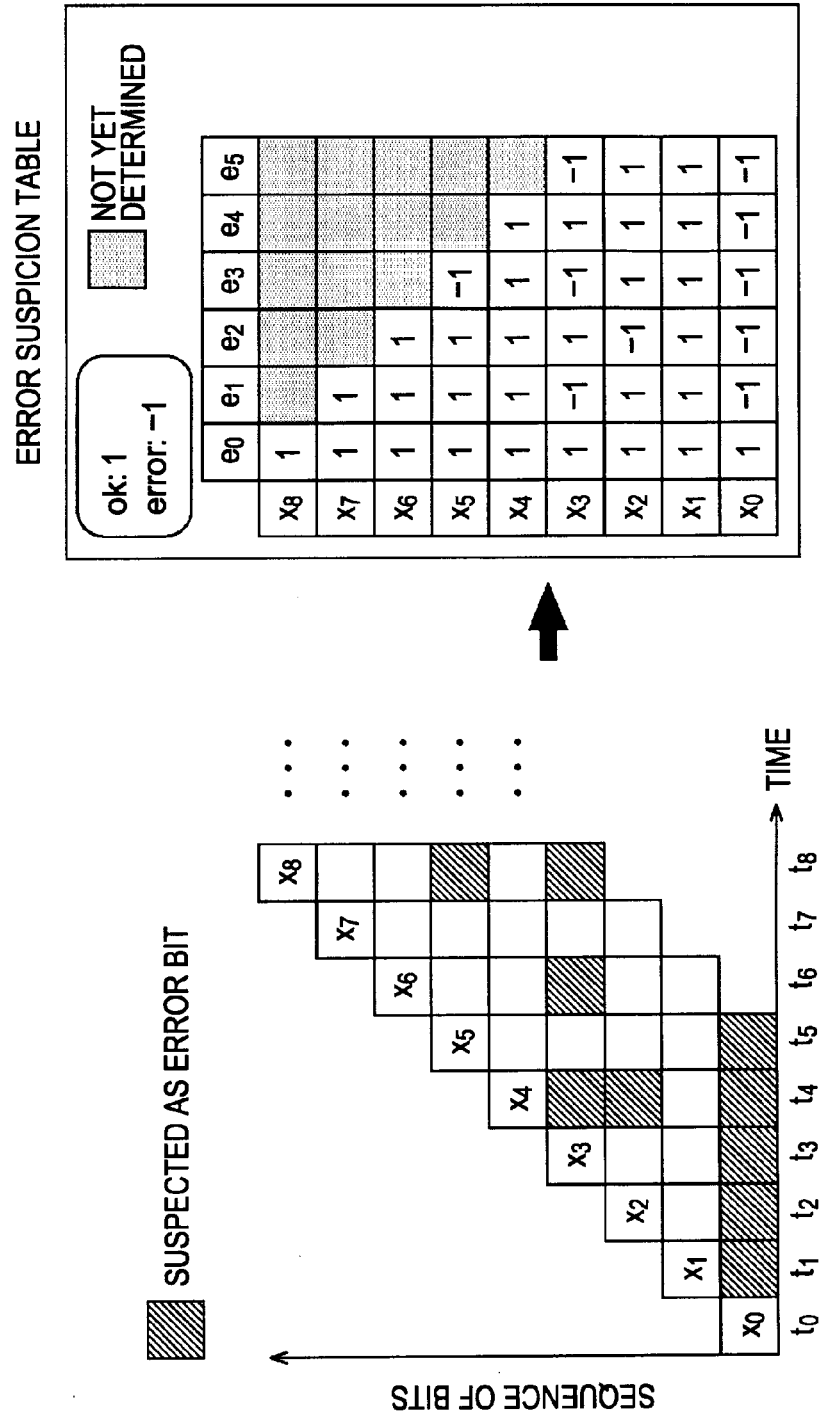
FIG. 18 is a diagram for explanation of error suspicion level values.

Referring to FIGS. 18 and 19, another method of determining an error suspicion level value is described below.

A change in a sequence of bits with the passage of time is shown on the left-hand side of FIG. 18 as with FIG. 15.

On the right-hand side of FIG. 18, shown is an error suspicion table in which flags are stored to indicate whether each bit has been selected as a suspicious bit looking incorrect. For example, if a particular bit is selected as a suspicious bit looking incorrect at a time $t_i$, −1 is set in a field corresponding to a flag $e_i$ associated with this particular bit to indicate that this particular bit is selected as a suspicious bit looking incorrect. On the other hand, if a particular bit is not selected as a suspicious bit looking incorrect at a time $t_i$, 1 is set in the field corresponding to the flag $e_i$ associated with this particular bit to indicate that this particular bit is not selected as a suspicious bit looking incorrect.

FIG. 19 shows a formula used to determine a weighted error suspicion level value by multiplying a value stored in the error suspicion table by a predetermined weighting factor.

A bit close to the current bit has a greater influence on the current bit than a bit far away from the current bit has an influence on the current bit. In view of the above, the weighting factors may be determined, for example, such that the weighting factor for the current bit is assigned 1, the weighting factor for the bit immediately before the current bit is assigned 0.5, the weighting factor for the bit 2 bits before the current bit is assigned 0.4, the weighting factor for the bit 3 bits before the current bit is assigned 0.3, the weighting factor for the bit 4 bits before the current bit is assigned 0.2, and the weighting factor for the bit 5 bits before the current bit is assigned 0.1.

The error correction unit 89 may be configured to determine whether a bit is correct or incorrect such that when the weighted error suspicion level value is calculated in accordance with the weighting factor formula shown in FIG. 19, if the calculated weighted error suspicion level value for the bit is smaller than 0, the bit is determined to be incorrect. In the specific example shown in FIG. 19, the error correction unit 89 determines that a bit $x_0$ is incorrect, while the error correction unit 89 determines that bits $x_1$ to $x_3$ are correct.

Use of the weighted error suspicion level values determined in the above-described manner makes it possible to achieve higher accuracy in the determination as to whether bits are correct or incorrect than in the case where the determination is performed by the decision-by-majority method described above with reference to FIG. 15.

Alternatively, the weighting factors may be determined depending on the delay profiles stored in the delay profile storage unit 75 shown in FIG. 5. For example, the average value of a delay profile may be used as the weighting factor. Because the delay profile indicates the degree of the influence of a bit transmitted before the current bit on the current bit, use of a value depending on the delay profile as the weighting factor leads to an improvement in accordance of the determination as to whether the bit is correct or incorrect.

In the examples described above, it is assumed that each test pattern signal includes 7 bits and a total of 7 patterns are used. Alternatively, a total of 128 ($=2^7$) patterns such as those shown in FIG. 20 realized by a combination of "0" or "1" for each of 7 bits may be used.

FIG. 20 illustrates 128 test pattern signals each including 7 bits each taking "0" or "1" and also illustrates examples of delay profiles acquired using test pattern signals.

When the delay profiles corresponding to the respective test pattern signals each including bits each taking "0" or "1" are acquired in advance, the delay profile corresponding to the test pattern signal including the same sequence of bits as the sequence of bits of the actually received signal may be directly used as the predicted distortion instead of calculating the predicted distortion according to equation (1). This makes it possible to quickly determine the value of the current bit.

The sequence of processing steps described above may be performed by means of hardware or software. When the processing sequence is executed by software, a program forming the software may be installed from a program storage medium onto a computer which is provided as dedicated hardware or may be installed onto a general-purpose computer capable of performing various processes in accordance with various programs installed thereon.

Figure 21:
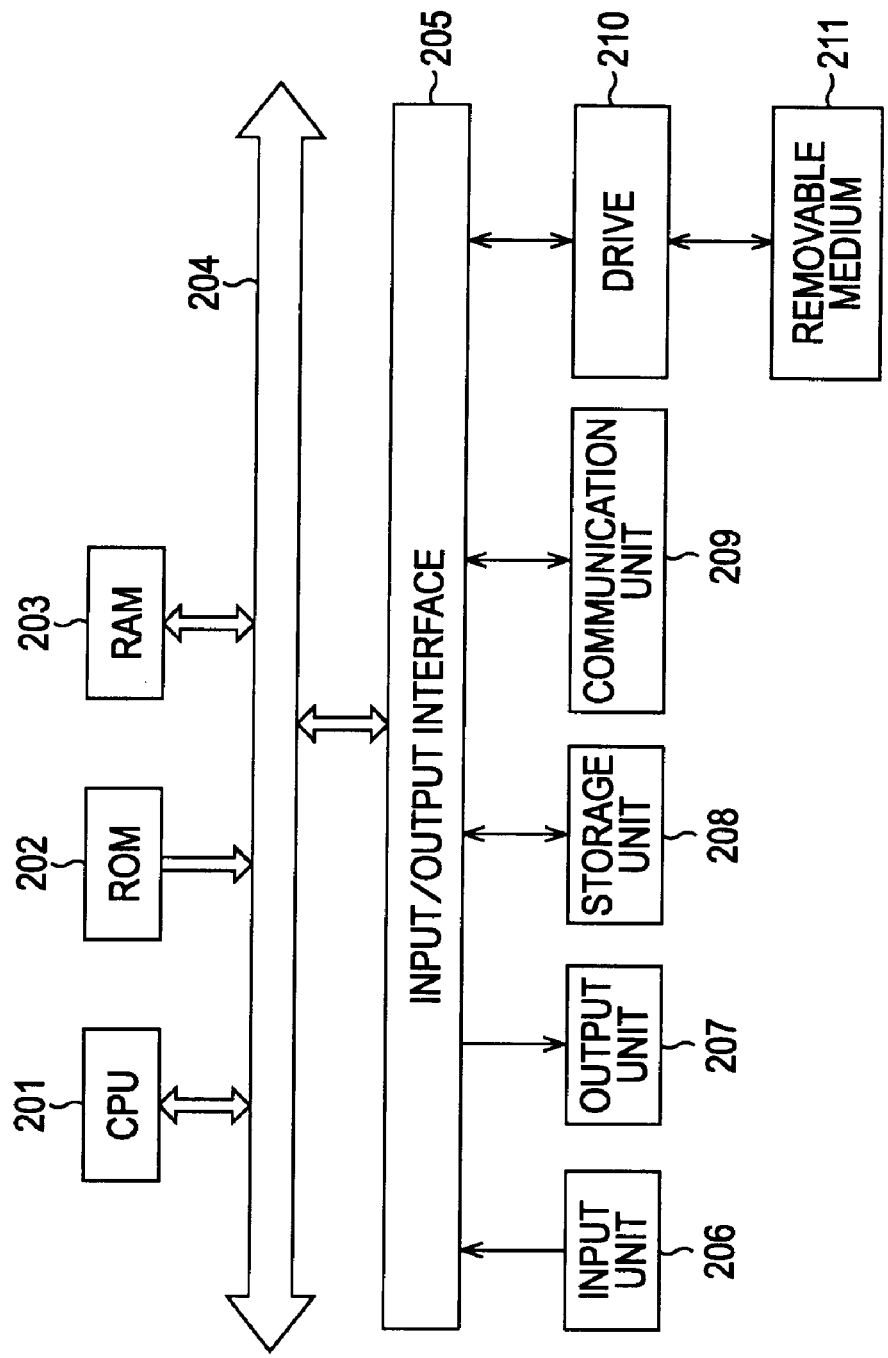
FIG. 21 is a block diagram illustrating an example of a configuration of a personal computer.

FIG. 21 is a block diagram illustrating an example of a personal computer configured to execute a program to perform the sequence of processing steps described above. A CPU (Central Processing Unit) 201 performs various processes in accordance with a program stored in a ROM (Read Only Memory) 202 or a storage unit 208. A RAM (Random Access Memory) 203 stores the program executed by the CPU 201 and also stores data used in the execution of the program. The CPU 201, the ROM 202, and the RAM 203 are connected to each other via a bus 204.

An input/output interface 205 is connected to the CPU 201 via the bus 204. The input/output interface 205 is also connected to an input unit 206 including a keyboard, a mouse, a microphone and the like and an output unit 207 including a display and a speaker. The CPU 201 performs various processes in accordance with commands input via the input unit 206 and outputs results of the processes to the output unit 207.

The storage unit 208 connected to the input/output interface 205 is realized, for example, by a hard disk and is adapted to store programs and data executed or used by the CPU 201. A communication unit 209 is adapted to communicate with an external apparatus via a network such as the Internet or a local area network.

The program may be acquired via the communication unit 209 and the acquired program may be stored in the storage unit 208.

When a removable medium 211 such as a magnetic disk, an optical disk, a magneto-optical disk or a semiconductor memory is mounted on a drive 210 connected to the input/output interface 205, the drive 210 drives the mounted removable medium 211 and acquires a program or data stored thereon. The acquired program or data is transferred, as required, to the storage unit 208 and stored therein.

The removable medium 211 shown in FIG. 21 is an example of a program storage medium usable for storing a computer-executable program to be installed in the computer. Specific examples of removable media for this purpose include a magnetic disk (such as a floppy disk), an optical disk (such as a CD-ROM (Compact Disk-Read Only Memory) and a DVD (Digital Versatile Disk)), a magneto-optical disk, and a semiconductor memory. A program may be stored temporarily or permanently in the ROM 202 or in the storage unit 208 such as a hard disk or the like. The program may be stored in the program storage medium via a wire communication medium such as a local area network or the Internet or via a wireless communication medium such as digital broadcasting, using the communication unit 209 serving as an interface such as a router or a modem.

The present invention is applicable not only to an apparatus using a modulating/coding method in which one bit is transmitted by one symbol, but also to other modulating/coding methods such as a QPSK (quadrature phase shift keying) or a 8PSK (quadrature phase shift keying) method in which a plurality of bits are transmitted by one symbol.

The present invention is applicable not only to wireless communication in a case of a signal processing apparatus but also to wireless communication in an open-air circumstance as long as delay profiles are fixed. In a communication system in which a signal is transmitted via a cable, reflection of the signal at an end of the cable can occur the reflected signal can interfere with the signal propagating in a forward direction. Because such interference occurs in a stationary manner, it is possible to improve communication quality by applying the present invention to such a communication system.

In a near-field transmission system using a magnetic field, a limited communication range leads to a restriction on locations of antennas used in communication. The signal processing apparatus 31 provides high-quality communication without being subjected to the restriction on locations of antennas.

In the present invention, the processing steps described above with reference to the flow charts are not necessarily required to be executed in time sequence according to the order described in the flow charts. Instead, the processing steps may be performed in parallel or separately (by means of parallel processing or object processing).

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus adapted to process a signal transmitted via a transmission path causing a waveform represented by a signal value of a specific symbol to have stationary distortion depending on a value of a symbol transmitted before the specific symbol, comprising:

acquisition means for acquiring the signal value of the specific symbol from the signal transmitted via the transmission path;

distortion removing means for removing, from the waveform represented by the signal value of the specific symbol acquired by the acquisition means, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform;

comparison value calculation means for calculating a comparison value for each of values allowed to be taken by the specific symbol, by subtracting, from a signal value of the distortion-removed waveform calculated by the distortion removing means, a signal value predicted as that of the specific symbol in accordance with a characteristic of the waveform represented by the signal value of the specific symbol depending on the value of the symbol transmitted before the specific symbol, for each of the values allowed to be taken by the specific symbol;

determination means for determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values;

suspected error detecting means for generating an error suspicion level value indicating a degree of suspicion of being incorrect for the value of each of a predetermined number of symbols, on the basis of values previously determined by the determination means for a predetermined number of symbols transmitted before the specific symbol, the characteristic of the distortion, and the smallest comparison value; and error correction means for correcting the values previously determined by the determination means for the specific symbol, in accordance with the error suspicion level values generated by the suspected error detecting means.

2. The signal processing apparatus according to claim 1, wherein the suspected error detecting means includes comparison value recalculation means for recalculating the comparison values by using a set of the values of the predetermined number of symbols obtained by changing, into another allowable value, the value of a bit in the set of values previously determined by the determination means for the predetermined number of symbols, and by using also the characteristic of the distortion and the smallest comparison value; and selection means for detecting a symbol corresponding to the changed value in the set of values of symbols for which the comparison value calculated by the comparison value recalculation means is the smallest, and selecting the detected symbol as a suspicious symbol looking incorrect, and wherein each time the determination means determines the value of the specific symbol, the comparison value recalculation means performs the comparison value calculation, and the selection means performs the suspicious symbol selection, whereby a number of times the specific symbol has been selected as the suspicious symbol by the selection means is employed as the error suspicion level value for the specific symbol.

3. The signal processing apparatus according to claim 2, wherein the suspected error detecting means calculates a product of a predetermined weighting factor and the number of times the specific symbol has been selected as the suspicious symbol by the selection means, and employs the resultant product as the error suspicion level value for the specific symbol.

4. The signal processing apparatus according to claim 1, further comprising receiving means for receiving a test signal including a plurality of symbols taking predetermined values; and characteristic acquisition means for determining the characteristic of the distortion on a basis of the signal value of the specific symbol of the test signal received by the receiving means and values of the plurality of symbols of the test signal.

5. A method of processing a signal transmitted via a transmission path causing a waveform represented by a signal value of a specific symbol to have stationary distortion depending on a value of a symbol transmitted before the specific symbol, comprising the steps of:

acquiring the signal value of the specific symbol from the signal transmitted via the transmission path;

removing, from the waveform represented by the signal value of the specific symbol, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform;

calculating a comparison value for each of values allowed to be taken by the specific symbol, by subtracting, from a signal value of the distortion-removed waveform, a signal value predicted as that of the specific symbol in accordance with a characteristic of the waveform represented by the signal value of the specific symbol depending on the value of the symbol transmitted before the specific symbol, for each of the values allowed to be taken by the specific symbol;

determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values;

generating an error suspicion level value indicating a degree of suspicion of being incorrect for the value of each of a predetermined number of symbols, on the basis of values previously determined for a predetermined number of symbols transmitted before the specific symbol, the characteristic of the distortion, and the smallest comparison value; and correcting the values previously determined for the specific symbol, in accordance with the error suspicion level values.

6. A non-transitory computer readable medium having computer instructions recorded thereon, the computer instructions executable by a computer to perform a method on a signal transmitted via a transmission path causing a waveform represented by a signal value of a specific symbol to have stationary distortion depending on a value of a symbol transmitted before the specific symbol, the method comprising the steps of:

acquiring the signal value of the specific symbol from the signal transmitted via the transmission path;

removing, from the waveform represented by the signal value of the specific symbol, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform;

calculating a comparison value for each of values allowed to be taken by the specific symbol, by subtracting, from a signal value of the distortion-removed waveform, a signal value predicted as that of the specific symbol in accordance with a characteristic of the waveform represented by the signal value of the specific symbol depending on the value of the symbol transmitted before the specific symbol, for each of the values allowed to be taken by the specific symbol;

determining the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values;

generating an error suspicion level value indicating a degree of suspicion of being incorrect for the value of each of a predetermined number of symbols, on the basis of values previously determined for a predetermined number of symbols transmitted before the specific symbol, the characteristic of the distortion, and the smallest comparison value; and correcting the values previously determined for the specific symbol, in accordance with the error suspicion level values.

7. A signal processing apparatus configured to process a signal transmitted via a transmission path causing a waveform represented by a signal value of a specific symbol to have distortion depending on a value of a symbol transmitted before the specific symbol, comprising:

an acquisition unit configured to acquire the signal value of the specific symbol from the signal transmitted via the transmission path;

a distortion removing unit configured to remove, from the waveform represented by the signal value of the specific symbol acquired by the acquisition unit, distortion predicted to occur in the waveform represented by the signal value of the specific symbol in accordance with a characteristic of distortion occurring in the waveform represented by the signal value of the specific symbol, depending on the value of the symbol transmitted before the specific symbol, thereby producing a distortion-removed waveform;

a comparison value generator configured to calculate a comparison value for each of values allowed to be taken by the specific symbol, by subtracting, from a signal value of the distortion-removed waveform calculated by the distortion removing unit, a signal value predicted as that of the specific symbol in accordance with a characteristic of the waveform represented by the signal value of the specific symbol depending on the value of the symbol transmitted before the specific symbol, for each of the values allowed to be taken by the specific symbol;

a determination unit configured to determine the value of the specific symbol of the signal transmitted via the transmission path, by comparing the comparison values of the respective values allowed to be taken by the specific symbol, detecting a smallest comparison value of all comparison values, and employing, as the value of the specific symbol, a value allowed to be taken by the specific symbol for which the smallest comparison value is obtained in the calculation of the comparison values;

a suspected error detection unit configured to generate an error suspicion level value indicating a degree of suspicion of being incorrect for the value of each of a predetermined number of symbols, on the basis of values previously determined by the determination unit for a predetermined number of symbols transmitted before the specific symbol, the characteristic of the distortion, and the smallest comparison value; and an error correction unit configured to correct the values previously determined by the determination unit for the specific symbol, in accordance with the error suspicion level values generated by the suspected error detection unit.

8. The method of processing a signal according to claim 5, wherein said step of generating the error suspicion level further includes:

recalculating the comparison values by using a set of the values of the predetermined number of symbols obtained by changing, into another allowable value, the value of a bit in the set of values previously determined by said step of determining the value of the specific symbol for the predetermined number of symbols, and by using also the characteristic of the distortion and the smallest comparison value; and detecting a symbol corresponding to the changed value in the set of values of symbols for which the comparison value calculated by the said step of calculating the comparison value is the smallest, and selecting the detected symbol as a suspicious symbol looking incorrect, and wherein each time said step of determining determines the value of the specific symbol, said step of recalculating the comparison values is performed, and said step of detecting the symbol performs the suspicious symbol selection, whereby a number of times the specific symbol has been selected as the suspicious symbol by said step of detecting is employed as the error suspicion level value for the specific symbol.

9. The non-transitory computer readable medium according to claim 6, wherein said step of generating the error suspicion level further includes:

recalculating the comparison values by using a set of the values of the predetermined number of symbols obtained by changing, into another allowable value, the value of a bit in the set of values previously determined by said step of determining the value of the specific symbol for the predetermined number of symbols, and by using also the characteristic of the distortion and the smallest comparison value; and detecting a symbol corresponding to the changed value in the set of values of symbols for which the comparison value calculated by the said step of calculating the comparison value is the smallest, and selecting the detected symbol as a suspicious symbol looking incorrect, and wherein each time said step of determining determines the value of the specific symbol, said step of recalculating the comparison values is performed, and said step of detecting the symbol performs the suspicious symbol selection, whereby a number of times the specific symbol has been selected as the suspicious symbol by said step of detecting is employed as the error suspicion level value for the specific symbol.

10. The signal processing apparatus according to claim 7, wherein the suspected error detecting unit further includes:

comparison value recalculation unit configured to recalculate the comparison values by using a set of the values of the predetermined number of symbols obtained by changing, into another allowable value, the value of a bit in the set of values previously determined by the determination unit for the predetermined number of symbols, and by using also the characteristic of the distortion and the smallest comparison value; and selection unit configured to detect a symbol corresponding to the changed value in the set of values of symbols for which the comparison value calculated by the comparison value recalculation unit is the smallest, and to select the detected symbol as a suspicious symbol looking incorrect, and wherein each time the determination unit determines the value of the specific symbol, the comparison value recalculation unit performs the comparison value calculation, and the selection unit performs the suspicious symbol selection, whereby a number of times the specific symbol has been selected as the suspicious symbol by the selection unit is employed as the error suspicion level value for the specific symbol.

* * * * *